United States Patent
Harada et al.

(10) Patent No.: US 10,608,548 B2
(45) Date of Patent: Mar. 31, 2020

(54) POWER CONVERSION DEVICE

(71) Applicant: DENSO CORPORATION, Kariya, Aichi-pref. (JP)

(72) Inventors: Daisuke Harada, Kariya (JP); Koichi Nambu, Kariya (JP); Norihiro Tanaka, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/080,932

(22) PCT Filed: Jan. 18, 2017

(86) PCT No.: PCT/JP2017/001570
§ 371 (c)(1),
(2) Date: Aug. 29, 2018

(87) PCT Pub. No.: WO2017/149972
PCT Pub. Date: Sep. 8, 2017

(65) Prior Publication Data
US 2019/0089265 A1    Mar. 21, 2019

(30) Foreign Application Priority Data

Feb. 29, 2016  (JP) ................................ 2016-037690
Sep. 23, 2016  (JP) ................................ 2016-185330

(51) Int. Cl.
*H02B 1/28*     (2006.01)
*H02M 7/00*     (2006.01)
(Continued)

(52) U.S. Cl.
CPC ............. *H02M 7/003* (2013.01); *B60L 50/51* (2019.02); *H02B 1/28* (2013.01); *H02M 7/48* (2013.01);
(Continued)

(58) Field of Classification Search
None
See application file for complete search history.

(56) References Cited

U.S. PATENT DOCUMENTS 4,854,377 A * 8/1989 Komoto ............... H01L 23/433
                                                            165/80.4
5,146,981 A * 9/1992 Samarov ............. H01L 21/4882
                                                            165/185
(Continued)

FOREIGN PATENT DOCUMENTS

CN      204163837 U    2/2015
JP      2015-220427 A  12/2015

OTHER PUBLICATIONS

Mar. 7, 2017 International Search Report issued in International Patent Application No. PCT/JP2017/001570.
(Continued)

*Primary Examiner* — Courtney L Smith
(74) *Attorney, Agent, or Firm* — Oliff PLC

(57) ABSTRACT

A power conversion device that can prevent decrease in sealing properties between a case and a fixed member. The power conversion device has a case, a fixed member, and a seal member. The case has a metallic case body. The fixed member is fixed to the case from the outside of the case. The seal member adheres closely to both the case and the fixed member to ensure water-tightness between the case and the fixed member. The case is partly formed with a corrosion-resistant portion that is less likely to suffer corrosion than the case body. The fixed member is attached to the corrosion-resistant portion via the seal member.

19 Claims, 36 Drawing Sheets

(51) Int. Cl.
*H02M 7/48* (2007.01)
*B60L 50/51* (2019.01)
(52) U.S. Cl.
CPC ....... *B60L 2210/10* (2013.01); *B60L 2210/30* (2013.01); *B60L 2210/40* (2013.01); *Y02T 10/7241* (2013.01)

(56) References Cited

U.S. PATENT DOCUMENTS

| | | | |
|---|---|---|---|
| 7,876,561 B2 * | 1/2011 | Schnetzka | F25B 49/025 180/297 |
| 8,149,579 B2 * | 4/2012 | Jadric | H05K 7/20936 165/80.4 |
| 8,437,134 B2 * | 5/2013 | Sarginger | B60R 16/0239 174/17 VA |
| 9,042,100 B2 * | 5/2015 | Kang | G06F 1/20 361/703 |
| 10,186,470 B2 * | 1/2019 | Abeyasekera | H01L 23/3735 |
| 10,214,109 B2 * | 2/2019 | Gohara | H01L 23/473 |
| 2001/0014029 A1 * | 8/2001 | Suzuki | H02M 7/003 363/141 |
| 2008/0079021 A1 * | 4/2008 | Bayerer | H01L 23/373 257/177 |
| 2008/0237847 A1 * | 10/2008 | Nakanishi | H01L 23/473 257/722 |
| 2013/0056185 A1 * | 3/2013 | Bayerer | H01L 23/36 165/134.1 |
| 2015/0152987 A1 | 6/2015 | Ishikawa | |

OTHER PUBLICATIONS

Mar. 7, 2017 Written Opinion issued in International Patent Application No. PCT/JP2017/001570.

* cited by examiner

POWER CONVERSION DEVICE

CROSS-REFERENCE TO RELATED APPLICATION

This patent application is based on Japanese Patent Application No. 2016-037690 filed on Feb. 29, 2016 and Japanese Patent Application No. 2016-185330 filed on Sep. 23, 2016 in the Japan Patent Office, the entire disclosure of which is incorporated herein by reference.

TECHNICAL FIELD

The present disclosure relates to a power conversion device including a case, a fixed member fixed to the case from the outside of the case, and a seal member.

BACKGROUND ART

Vehicles such as electric automobiles and hybrid automobiles are equipped with a power conversion device performing power conversion between direct-current power and altering-current power, for example. Patent Literature 1 (PTL 1) discloses a power conversion device that has a case and an outer refrigerant pipe connected to the case from the outside. The outer refrigerant pipe is fixed to the case by bolts.

An O-ring is disposed between the outer refrigerant pipe and the case. The O-ring adheres closely to both the case and the outer refrigerant pipe. This configuration ensures sealing properties between the case and the outer refrigerant pipe and suppresses entry of water or the like from the outside to inside of the case. The case is formed from aluminum, for example, by die-casting.

CITATION LIST

Patent Literature

[PTL 1] JP 2015-109322 A

SUMMARY OF THE INVENTION

In the power conversion device described in PTL 1, there is a concern about decrease in the sealing properties between the case and the outer refrigerant pipe.

Specifically, in the foregoing power conversion device, if water sticks to the surface of the case, for example, the surface of the case may suffer corrosion. In addition, when such corrosion occurs on the surface of the case in contact with the O-ring of the case, the sealing (adhesiveness) between the contact surface and the O-ring may become lowered. As a result, it is risked that the sealing properties between the case and the outer refrigerant pipe fixed to the case will decrease.

In coastal regions and cold areas, in particular, aqueous solutions promoting the corrosion of the case such as sea water and a calcium chloride solution for use in a snow melting agent are likely to stick to the case. Therefore, the foregoing risk further increases in such coastal regions and cold areas.

An object of the present disclosure is to provide a power conversion device that prevents reduction in the sealing properties between a case and a fixed member fixed to the case.

A first aspect of the present disclosure is a power conversion device that includes:

a case having a metallic case body, a fixed member that is fixed to the case from the outside of the case, and a seal member that adheres closely to both the case; and the fixed member to ensure water-tightness between the case and the fixed member.

The case is partly formed with a corrosion-resistant portion that is less likely to suffer corrosion than the case body, and the fixed member is attached to the corrosion-resistant portion via the seal member.

In the power conversion device, the fixed member is attached to the corrosion-resistant portion via the seal member. Therefore, it is possible to prevent corrosion of a region of the case in contact with the seal member. Accordingly, it is possible to prevent decrease in the sealing between the seal member and the case. As a result, it is possible to prevent decrease in the sealing properties between the case and the fixed member.

The case is partly formed with the corrosion-resistant portion. Therefore, it is possible to reduce the material costs of the case as compared to the entirely corrosion-resistant case.

As described above, according to the present disclosure, it is possible to provide a power conversion device that can prevent decrease in the sealing properties between a case and a fixed portion.

BRIEF DESCRIPTION OF THE DRAWINGS

The foregoing and other objects, features, and advantages of the present disclosure will be more clarified by the following detailed description with reference to the attached drawings.

DESCRIPTION OF EMBODIMENTS

First Embodiment

A first embodiment of a power conversion device will be described with reference to FIGS. 1 to 5.

Figure 1:
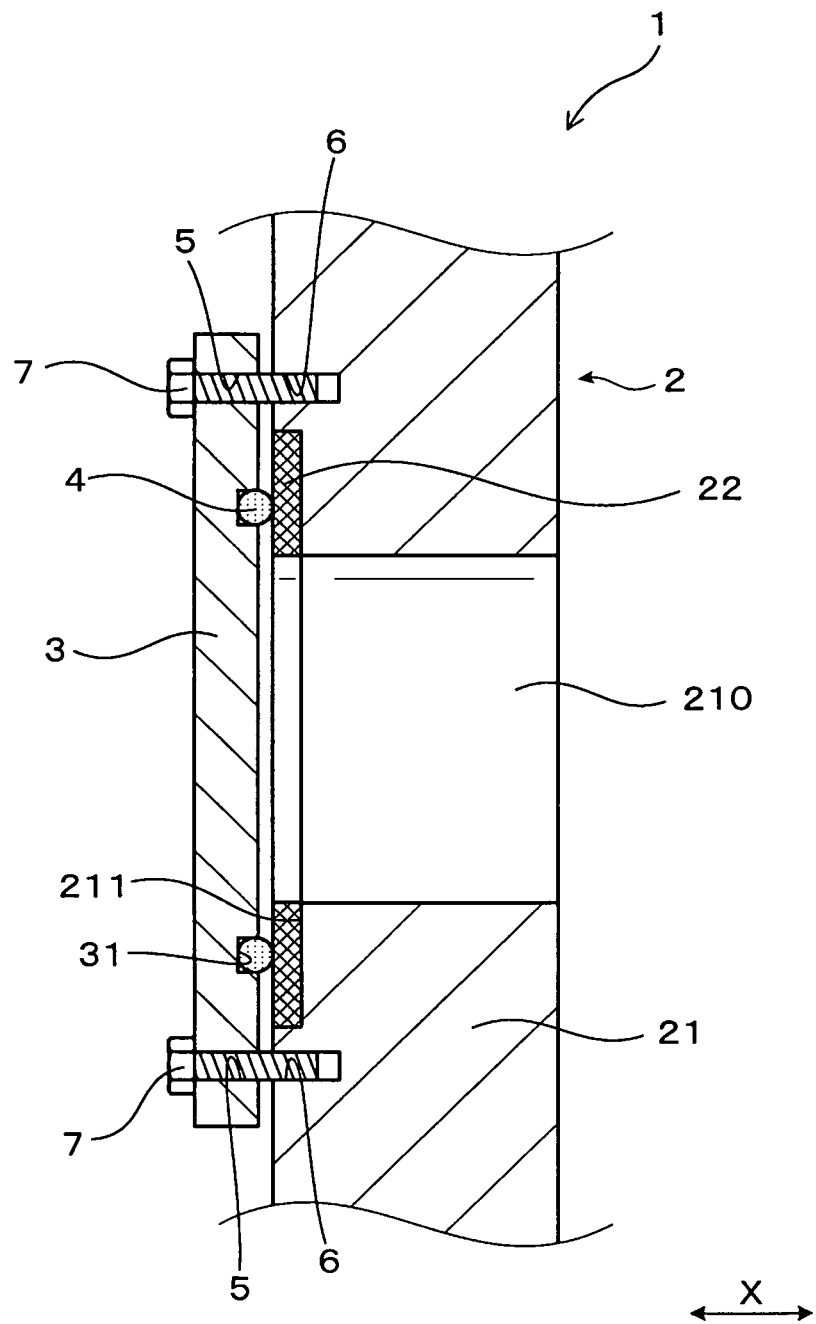
FIG. 1 is an enlarged cross-sectional view of a power conversion device according to a first embodiment, which passes through a corrosion-resistant portion.
Figure 2:
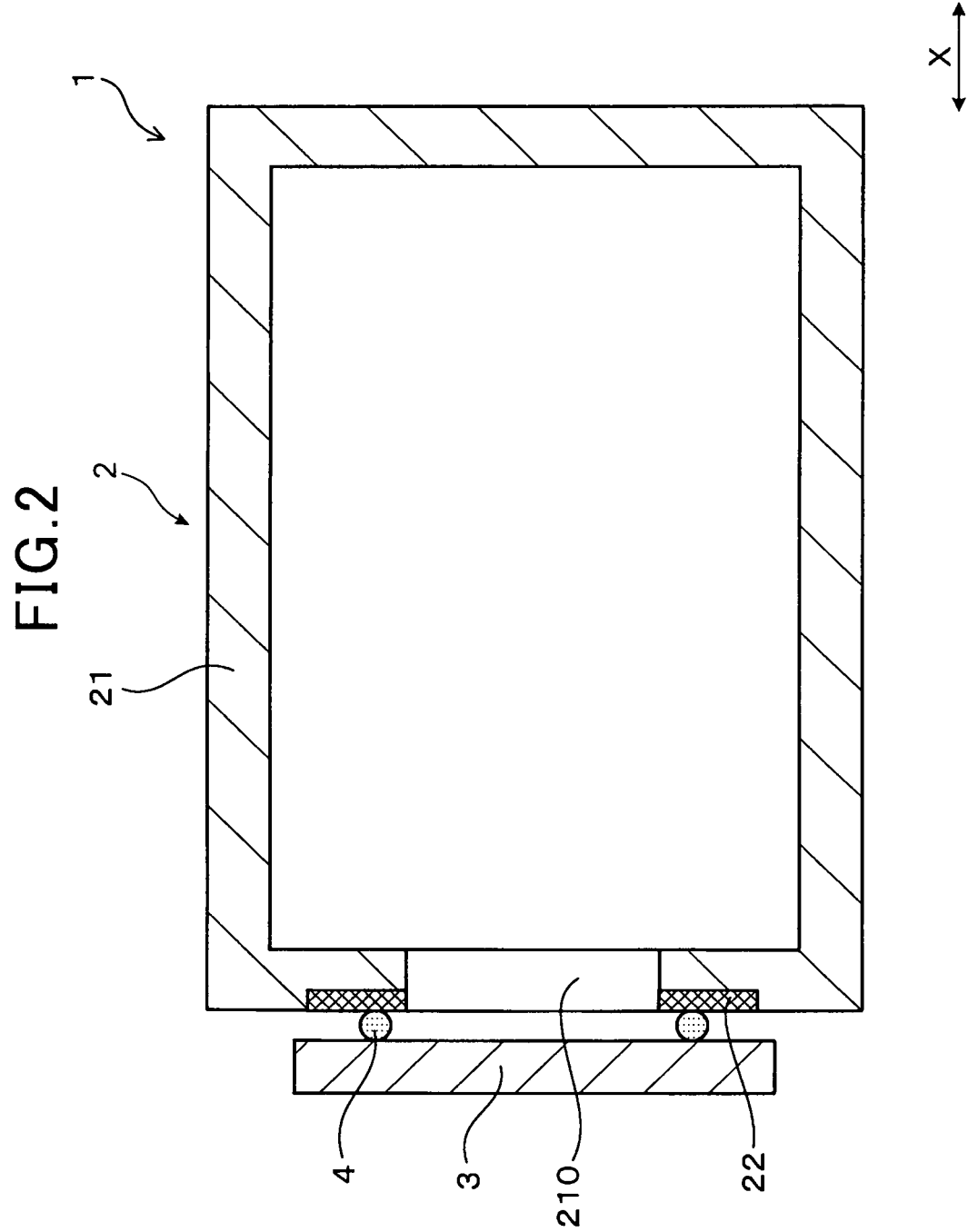
FIG. 2 is a schematic overall cross-sectional view of the power conversion device according to the first embodiment, which passes through the corrosion-resistant portion.
Figure 3:
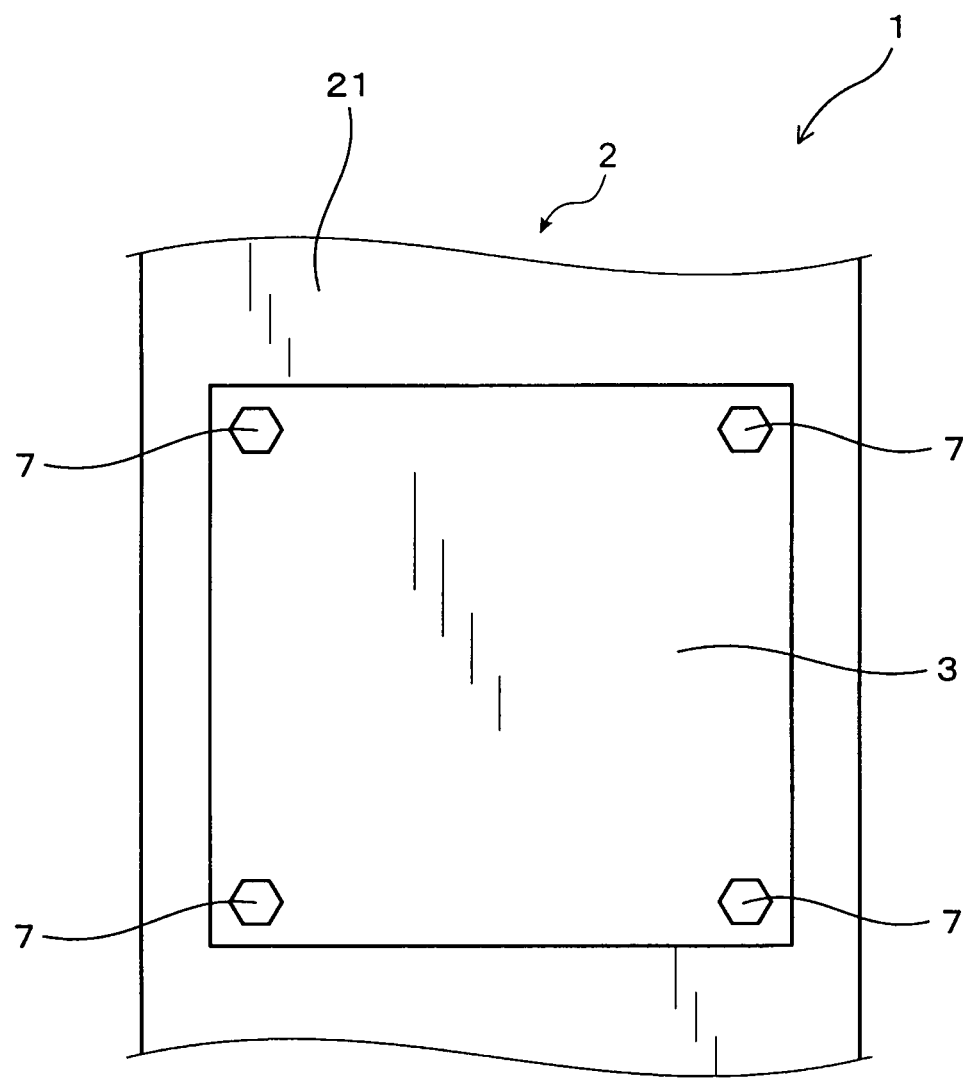
FIG. 3 is a diagram illustrating a cover and its surroundings as the power conversion device is seen from the front side according to the first embodiment.
Figure 4:
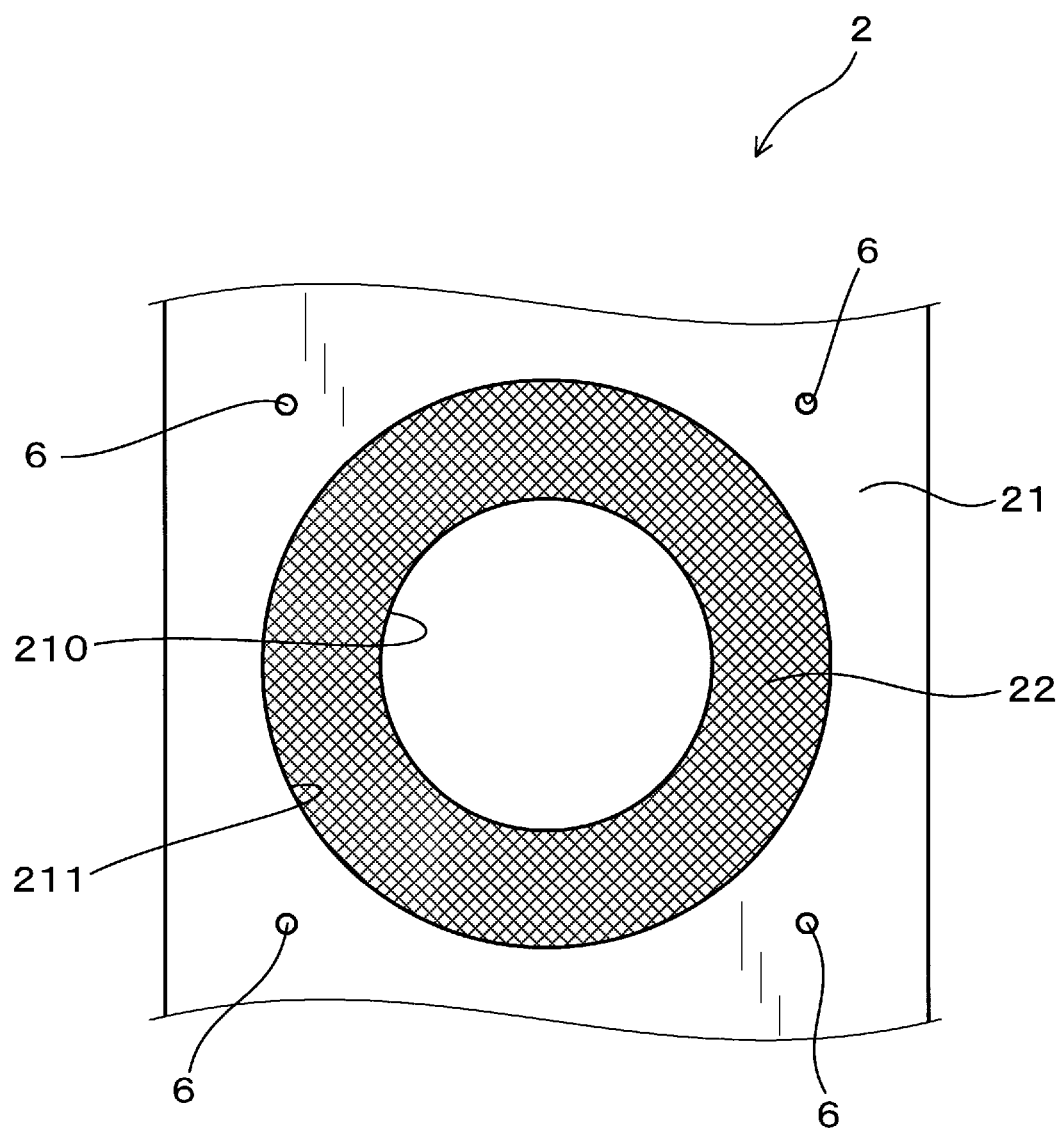
FIG. 4 is a diagram illustrating the corrosion-resistant portion and its surroundings as the case is seen from the front side according to the first embodiment.

As illustrated in FIGS. 1 and 2, a power conversion device 1 according to the first embodiment has a case 2, a cover 3 as a fixed member, and an O-ring 4 as a seal member. The case 2 includes a metallic case body 21. The cover 3 is fixed to the case 2 from the outside of the case 2. The O-ring 4 adheres closely to both the case 2 and the cover 3 to ensure the water-tightness between the case 2 and the cover 3. The case 2 is partly formed with a corrosion-resistant portion 22 that is less likely to suffer corrosion than the case body 21. The cover 3 is attached to the corrosion-resistant portion 22 via the O-ring 4. In FIG. 4, the corrosion-resistant portion 22 is hatched from the point of view of differentiating the corrosion-resistant portion 22 from other portions.

The power conversion device 1 is mounted in a vehicle. The power conversion device 1 may be an inverter mounted in an electric automobile or a hybrid automobile, for example. The inverter is configured to perform power conversion between a direct-current power source and an alternating-current rotary machine, for example. However, the power conversion device 1 is not limited to this but may be a DC-DC converter or the like, for example. For the sake of convenience, the direction of fixing the cover 3 to the case 2 will be called "longitudinal direction X". As seen in the longitudinal direction X, the cover 3 side will be called front side and the case 2 side will be called rear side.

As illustrated in FIGS. 1 and 2, in the first embodiment, the case body 21 has a body through-hole 210 that penetrates the inside and outside of the case 2. The body through-hole 210 may be intended, for example, to fasten together members disposed in a case 2 from the outside of the case 2. The cover 3 blocks the body through-hole 210 from the outside of the case 2.

Figure 5:
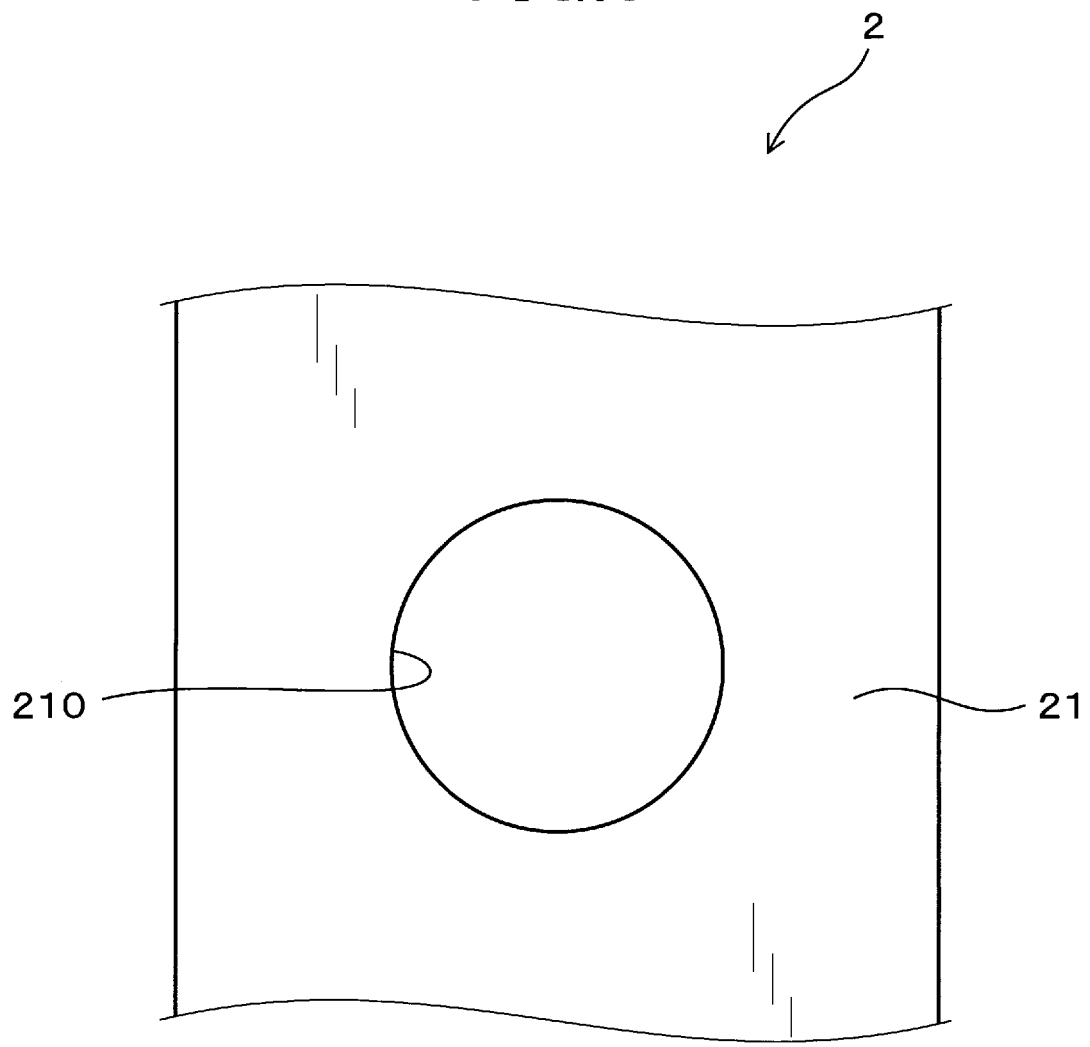
FIG. 5 is a diagram illustrating the corrosion-resistant portion and its surroundings as the case is seen from the rear side according to the first embodiment.

The case body 21 is a molded body that is formed from aluminum by die-casting. As illustrated in FIGS. 4 and 5, the body through-hole 210 has a circular cross section orthogonal to the longitudinal direction X. As illustrated in FIG. 1, an annular concave portion 211 recessed toward the rear side is formed around the periphery of the body through-hole 210 on the front surface of the case body 21. As illustrated in FIG. 4, the annular concave portion 211 is ring-shaped as seen from the front side.

As illustrated in FIGS. 1 and 4, the corrosion-resistant portion 22 is fitted into the annular concave portion 211. The corrosion-resistant portion 22 and the annular concave portion 211 are equal in size. In the first embodiment, the corrosion-resistant portion 22 has an annular cross section orthogonal to the longitudinal direction X. The corrosion-resistant portion 22 is plate-like, ring-shaped as seen from the longitudinal direction X. The corrosion-resistant portion 22 is bonded to the annular concave portion 211 by an adhesive.

As described above, the corrosion-resistant portion 22 is formed from a material that is less likely to suffer corrosion than the case body 21. In the first embodiment, the corrosion-resistant portion 22 is formed from a metal or an alloy. Specifically, the corrosion-resistant portion 22 is formed from stainless steel. Alternatively, the corrosion-resistant portion 22 may be formed from a non-ferrous metal or its alloy, for example. The corrosion-resistant portion 22 may be formed by applying facial treatment such as anodizing to part of the aluminum case body 21. The corrosion-resistant portion 22 is not limited to a metal or an alloy but may be formed from a resin, for example.

As illustrated in FIG. 1, the cover 3 is disposed to cover the body through-hole 210 in a case 2 from the front side. The annular O-ring 4 is disposed in a portion of the cover 3 opposed to the corrosion-resistant portion 22. The O-ring 4 is formed from a rubber. The entire perimeter of the O-ring 4 is pressure-welded to the entire perimeter of the front surface of the corrosion-resistant portion 22. The O-ring 4 is held in a hold groove 31 that is recessed toward ward the front side on the back surface of the cover 3.

The cover 3 is formed from a metal. As illustrated in FIGS. 1 and 4, the cover 3 has a plurality of bolt insertion holes 5 positioned on the outer peripheral side of the O-ring 4. As illustrated in FIG. 1, in the first embodiment, the case body 21 has bolt screwing holes (threaded bolt-holes) 6 for screwing bolts 7 into positions overlapping the bolt insertion holes 5 in the longitudinal direction X. The bolt insertion holes 5 in the cover 3 and the bolt screwing holes 6 in the case body 21 are formed on the outer peripheral side of the corrosion-resistant portion 22. The cover 3 is fastened and fixed to the case 2 by inserting the bolts 7 into the bolt insertion holes 5 and screwing into the bolt screwing holes 6. The O-ring 4 is elastically compressed in the longitudinal direction X by the axial force of the bolts 7 to ensure the sealing (adhesiveness) between the corrosion-resistant portion 22 and the O-ring 4.

Next, operations and effects of the first embodiment will be described.

In the power conversion device 1, the cover 3 is attached to the corrosion-resistant portion 22 via the O-ring 4. Therefore, it is possible to prevent the corrosion of a region of the case 2 in contact with the O-ring 4. Accordingly, it is possible to prevent reduction in sealing between the O-ring 4 and the case 2. As a result, it is possible to prevent reduction in sealing properties between the case 2 and the cover 3.

The case 2 is partly formed with the corrosion-resistant portion 22. Therefore, it is possible to reduce the material costs of the case 2 as compared to a case where the entire case 2 constitutes the corrosion-resistant portion 22.

The corrosion-resistant portion 22 is formed from a metal or an alloy. Therefore, it is possible to bring the linear expansion coefficient of the corrosion-resistant portion 22 close to the linear expansion coefficient of the metallic case body 21. This suppresses application of thermal stress resulting from the difference in linear expansion coefficient between the corrosion-resistant portion 22 and the case body 21 to the corrosion-resistant portion 22 and the case body 21. Accordingly, the corrosion-resistant portion 22 or the case body 21 can be improved in durability.

The corrosion-resistant portion 22 is formed from stainless steal. Therefore, the corrosion-resistant portion 22 can be produced at low cost.

The power conversion device 1 is mounted in a vehicle. Therefore, the effect of suppressing decrease in the sealing properties between the case 2 and the cover 3 can be further easily achieved. Specifically, the power conversion device 1 for vehicle is required for durability in various environments. For example, aqueous solutions promoting the corrosion of the case 2 such as sea water and a calcium chloride solution for use in a snow melting agent may stick to the case 2. In this instance, the surface of the case 2 in contact with the seal member may suffer corrosion to decrease the sealing properties between the case 2 and the cover 3. Accordingly, by the adoption of the foregoing configuration, the effect of suppressing decrease in sealing properties can be particularly expected in the power conversion device 1 for vehicle.

The bolt insertion holes 5 in the cover 3 and the bolt screwing holes 6 in the case body 21 are formed on the outer peripheral side of the corrosion-resistant portion 22. Therefore, the cover 3 can be fixed to the case 2 without forming holes in the corrosion-resistant portion 22 for insertion of the bolts 7. This reduces the manufacturing costs of the case 2.

As described above, according to the first embodiment, it is possible to provide a power conversion device that prevents decrease in the sealing properties between a case and a fixed member.

Second Embodiment

Figure 6:
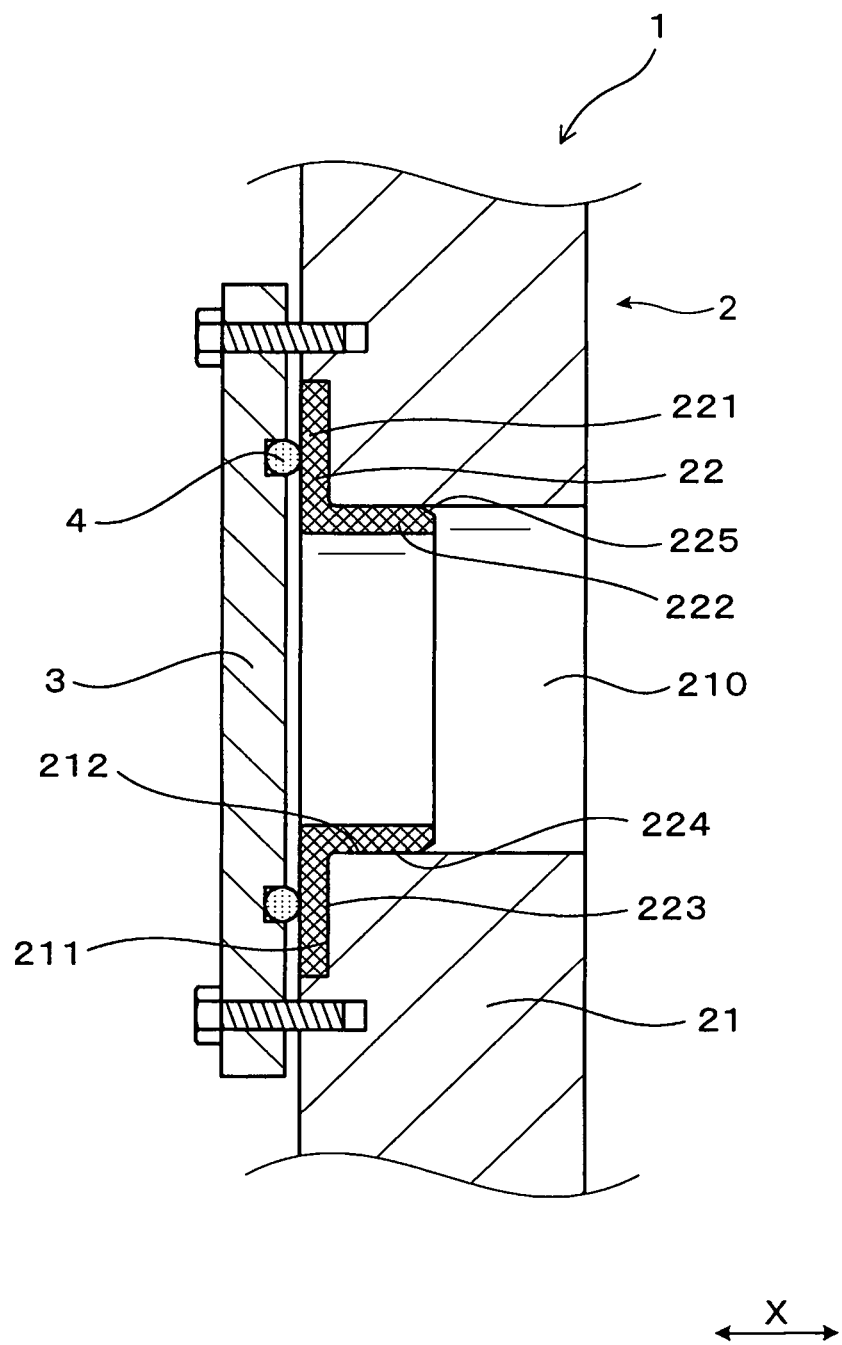
FIG. 6 is an enlarged cross-sectional view of a power conversion device according to a second embodiment, which passes through a corrosion-resistant portion.

In a second embodiment, as illustrated in FIG. 6, the shape of the corrosion-resistant portion 22 in the first embodiment is changed. Specifically, the corrosion-resistant portion 22 has a plate-like portion 221 and an extension portion 222 extended from part of the plate-like portion 221 to the rear side. In addition, at least a back surface 223 of the plate-like portion 221 and an outer peripheral surface 224 of the extension portion 222 are in contact with the case body 21.

Figure 7:
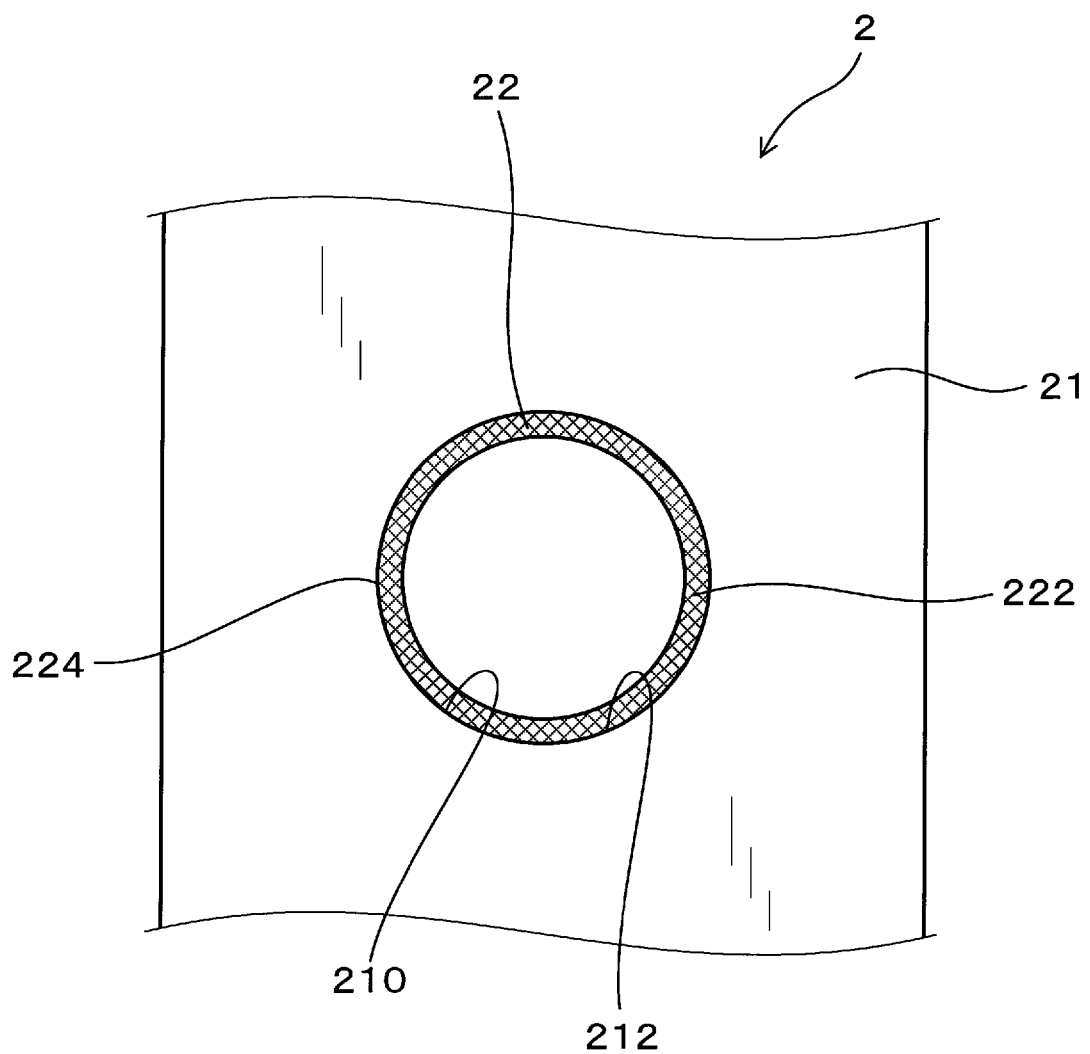
FIG. 7 is a diagram illustrating the corrosion-resistant portion and its surroundings as the case is seen from the rear side according to the second embodiment.

The plate-like portion 221 has a thickness in the longitudinal direction X. The plate-like portion 221 is ring-shaped as seen from the longitudinal direction X. The extension portion 222 is extended from an inner peripheral end portion of the plate-like portion 221 to the rear side. As illustrated in FIGS. 6 and 7, the extension portion 222 has a cylindrical shape. In the second embodiment as well, the corrosion-resistant portion 22 has an annular cross section orthogonal to the longitudinal direction X. That is, the cross section of the corrosion-resistant portion 22 orthogonal to the longitudinal direction X is annular, specifically, ring-shaped, at both the plate-like portion 221 and the extension portion 222.

As illustrated in FIG. 6, the corrosion-resistant portion 22 is press-fitted into a press-fit hole portion 212 formed in the case body 21. In the second embodiment, the corrosion-resistant portion 22 is press-fitted into the front part of the body through-hole 210 in the case body 21. That is, the front part of the body through-hole 210 constitutes the press-fit hole portion 212. The corrosion-resistant portion 22 is press-fitted into the press-fit hole portion 212 at the extension portion 222. Accordingly, the outer peripheral surface 224 of the extension portion 222 is pressure-welded to the press-fit hole portion 212. As illustrated in FIG. 7, the surface of the corrosion-resistant portion 22 in contact with the press-fit hole portion 212 has a circular cross section orthogonal to the longitudinal direction X. That is, the outer peripheral surface 224 of the extension portion 222 has a circular cross section orthogonal to the longitudinal direction X. In the second embodiment, the outer peripheral surface of the plate-like portion 221 also has a circular cross section orthogonal to the longitudinal direction X. As illustrated in FIG. 6, a back end portion of the outer peripheral surface 224 of the extension portion 222 is inclined such that the outer diameter becomes smaller toward the rear side. The back surface 223 of the plate-like portion 221 is pressure-welded to the front surface of the annular concave portion 211.

In other respects, the second embodiment is equal to the first embodiment. Out of the reference signs used in the second embodiment and the subsequent embodiments, the same ones as those used in the first embodiment, unless otherwise specified, represent the same constituent elements as those in the first embodiment.

In the second embodiment, the corrosion-resistant portion 22 has the plate-like portion 221 and the extension portion 222. The corrosion-resistant portion 22 has at least the back surface 223 of the plate-like portion 221 and the outer peripheral surface 224 of the extension portion 222 in contact with the case body 21. Therefore, the contact area between the corrosion-resistant portion 22 and the case body 21 can be easily increased. This enhances the force of fixation and adhesion of the corrosion-resistant portion 22 to the case body 21.

The corrosion-resistant portion 22 is press-fitted into the press-fit hole portion 212. Therefore, the force of fixation and adhesion between the corrosion-resistant portion 22 and the case body 21 is less likely to decrease over time as compared to a case where the corrosion-resistant portion 22 is brought into adhesion to the case body 21 by an adhesive or the like, for example.

The surface of the corrosion-resistant portion 22 in contact with the press-fit hole portion 212 has a circular cross section orthogonal to the longitudinal direction X. Therefore, no corner is formed on the surface of the corrosion-resistant portion 22 in contact with the press-fit hole portion 212. Accordingly, it is possible to suppress application of a large force from the corrosion-resistant portion 22 to the case body 21 when the corrosion-resistant portion 22 is press-fitted into the press-fit hole portion 212.

In the second embodiment as well, the corrosion-resistant portion 22 has an annular cross section orthogonal to the longitudinal direction X. Accordingly, even when the corrosion-resistant portion 22 is press-fitted into the case body 21, it is possible to prevent excessive application of various kinds of force from the corrosion-resistant portion 22 to the case body 21. The various kinds of force include, for example, force generated by press-fitting the corrosion-resistant portion 22 into the case body 21 and stress resulting from the difference between the linear expansion coefficient of the corrosion-resistant portion 22 and the linear expansion coefficient of the case body 21.

Other features of the second embodiment provide the same operations and effects as those of the first embodiment.

Third Embodiment

Figure 8:
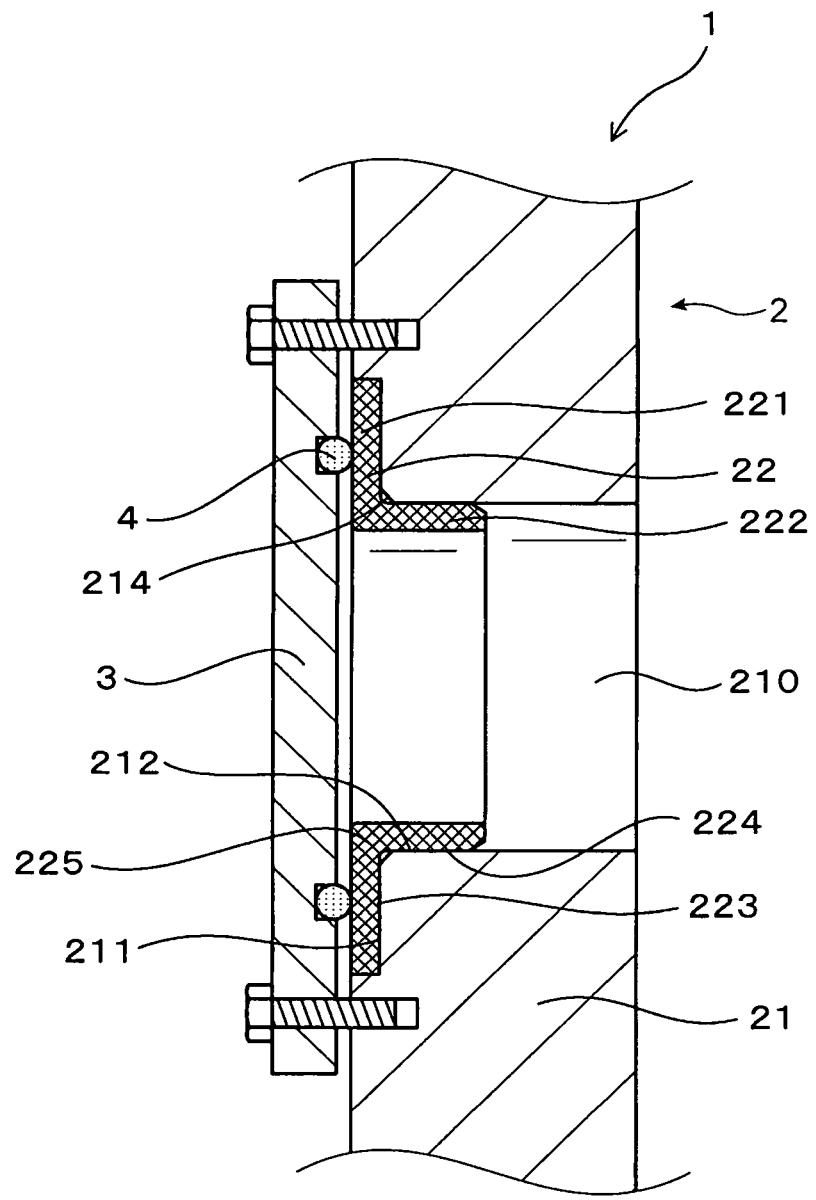
FIG. 8 is an enlarged cross-sectional view of a power conversion device according to a third embodiment, which passes through a corrosion-resistant portion.
Figure 9:
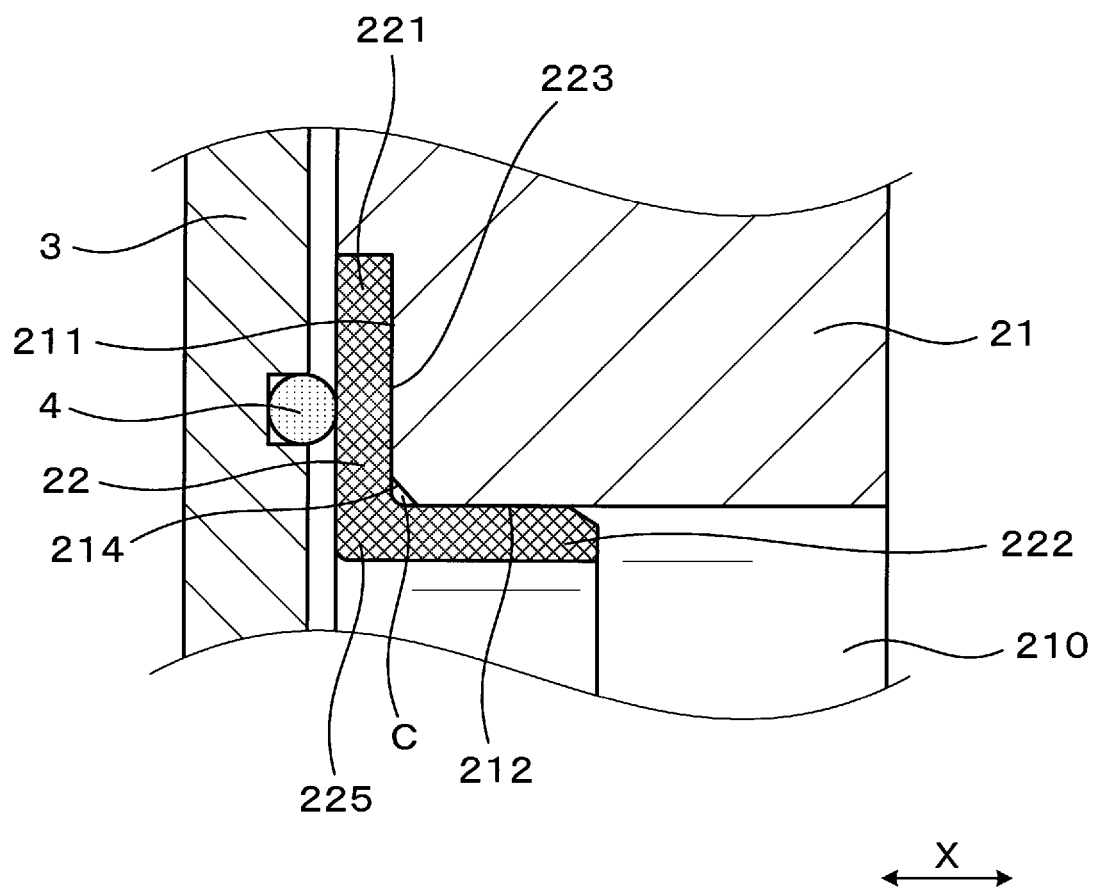
FIG. 9 is an enlarged view of an inclined portion and its surroundings illustrated in FIG. 8.

In a third embodiment, as illustrated in FIGS. 8 and 9, the shape of the case body 21 in the second embodiment is changed. In the third embodiment, the case body 21 has an inclined portion (beveled surface) 214 that is inclined with a diameter increasing forward from the front end of the press-fit hole portion 212. In the third embodiment, the inclined portion 214 is coupled to the inner peripheral end edge of the annular concave portion 211. The inclined portion 214 is formed on the entire perimeter of the body through-hole 210.

As in the second embodiment, the extension portion 222 of the corrosion-resistant portion 22 is press-fitted into the press-fit hole portion 212 of the case body 21 and the back surface 223 of the plate-like portion 221 is pressure-welded to the front surface of the annular concave portion 211. In addition, as illustrated in FIG. 9, a clearance C is formed between a root portion 225 of the plate-like portion 221 and the extension portion 222 and the inclined portion 214 of the case body 21.

In other respects, the third embodiment is identical to the second embodiment.

In the third embodiment, it is possible to reduce stress resulting from press-fitting the corrosion-resistant portion 22 into the press-fit hole portion 212 and applied to the root portion 225. For example, if the case body 21 does not have the inclined portion 214, the root portion 225 of the corrosion-resistant portion 22 is also press-fitted. Therefore, in this case, the root portion 225 of the corrosion-resistant portion 22 is directly subjected to the press-fitting stress from the case body 21. Accordingly, excessive stress is likely to be applied to the root portion 225. On the other hand, when the case body 21 has the inclined portion 214 as in the third embodiment, the clearance C is formed between the root portion 225 of the corrosion-resistant portion 22 and the case body 21 while the corrosion-resistant portion 22 is press-fitted into the press-fit hole portion 212. Accordingly, the root portion 225, and the press-fit hole portion 212 and the annular concave portion 211 can be kept separated from each other. Therefore, it is possible to prevent direct application of stress to the root portion 225 of the corrosion-resistant portion 22. As a result, it is possible to suppress concentration of stress on the root portion 225.

Other features of the third embodiment provide the same operations and effects as those of the second embodiment.

Fourth Embodiment

Figure 10:
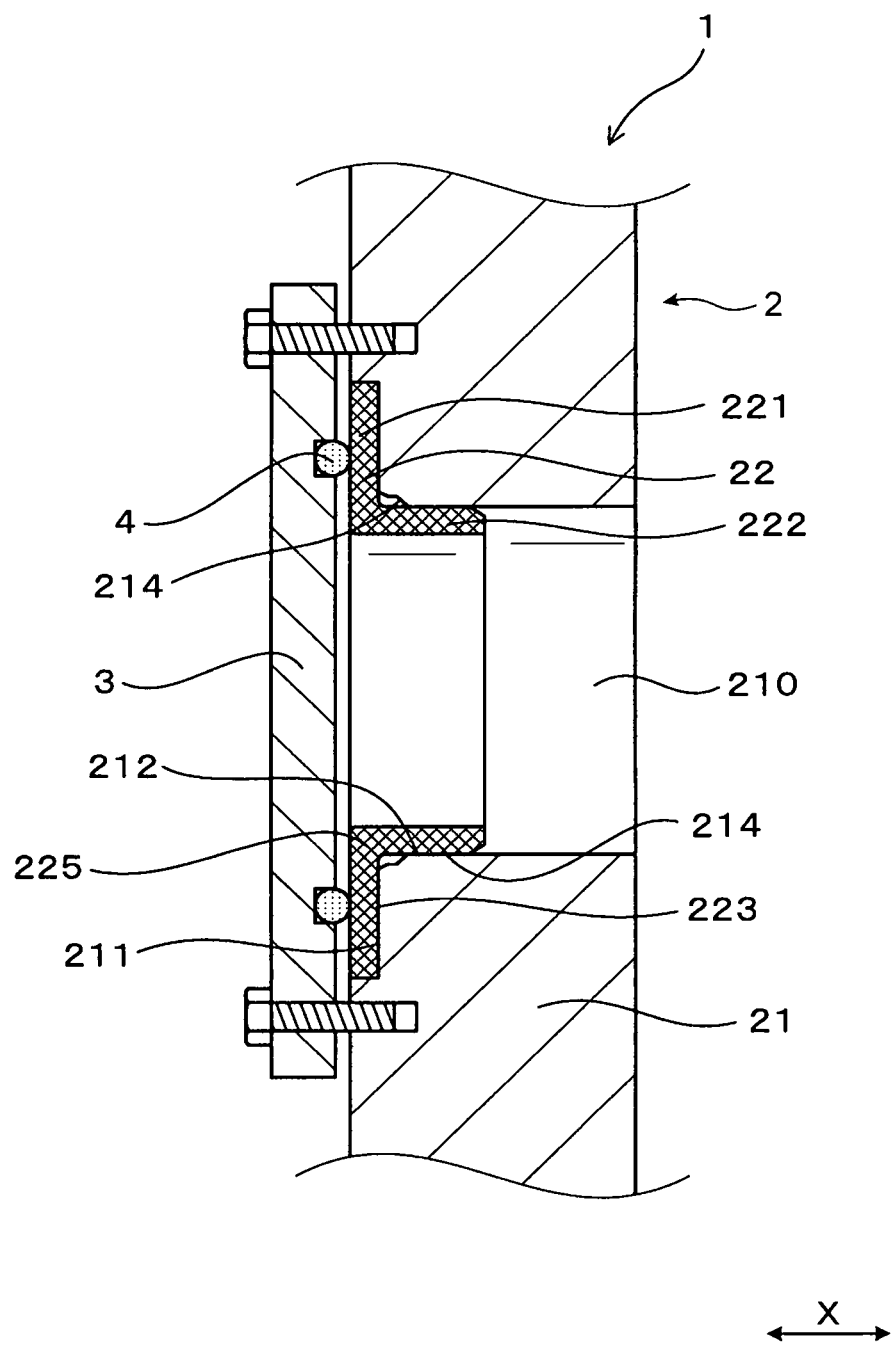
FIG. 10 is an enlarged cross-sectional view of a power conversion device according to a fourth embodiment, which passes through a corrosion-resistant portion.
Figure 11:
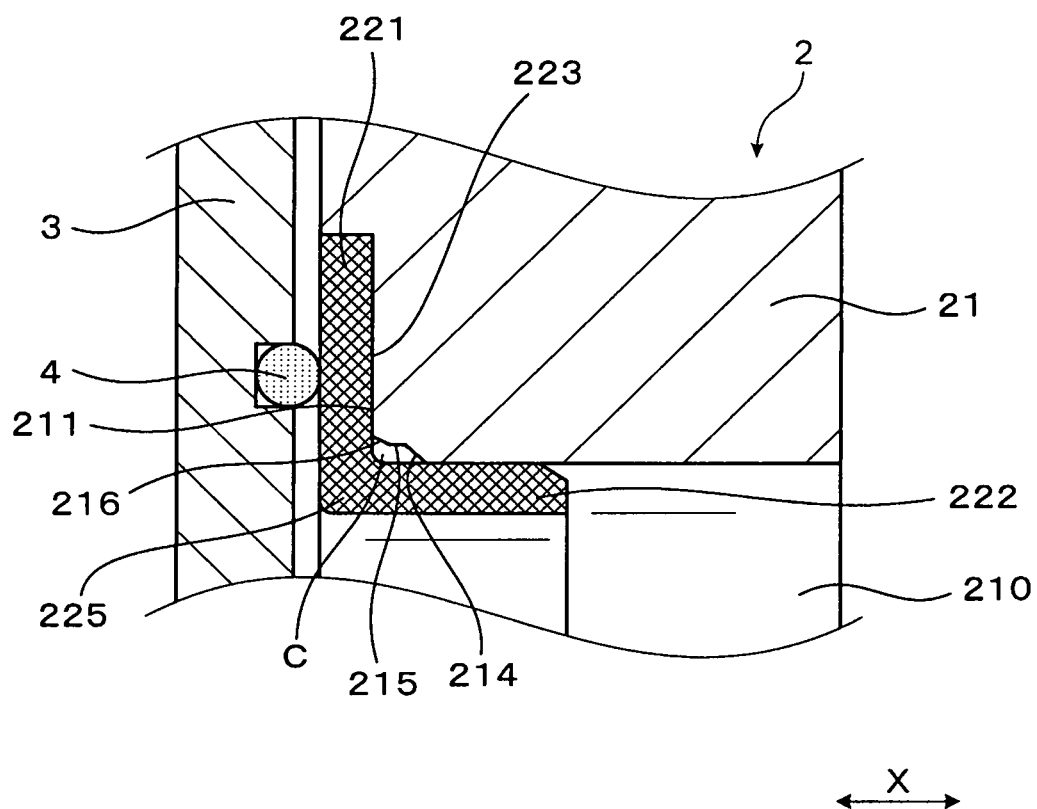
FIG. 11 is an enlarged view of an inclined portion and its surroundings illustrated in FIG. 10.

In a fourth embodiment, as illustrated in FIGS. 10 and 11, the inclined portion (beveled surface) 214 is separated a predetermined distance backward from the back surface 223 of the plate-like portion 221. As illustrated in FIG. 11, the body through-hole 210 has a constant diameter portion 215 that is formed forward from the front end of the inclined portion 214. The constant diameter portion 215 is formed such that the inner diameter is constant in the longitudinal direction X. The body through-hole 210 also has an increased diameter portion 216 that is formed forward from the front end of the constant diameter portion 215. The increased diameter portion 216 is inclined to increase in diameter forward. The front end of the increased diameter portion 216 is coupled to the inner peripheral end edge of the annular concave portion 211.

In other respects, the fourth embodiment is identical to the third embodiment.

In the fourth embodiment, the root portion 225 of the plate-like portion 221 and the extension portion 222, and the press-fit hole portion 212 and the annular concave portion 211 can be kept further separated from each other, thereby further suppressing concentration of stress on the root portion 225.

Other features of the fourth embodiment provide the same operations and effects as those of the third embodiment.

Fifth Embodiment

Figure 12:
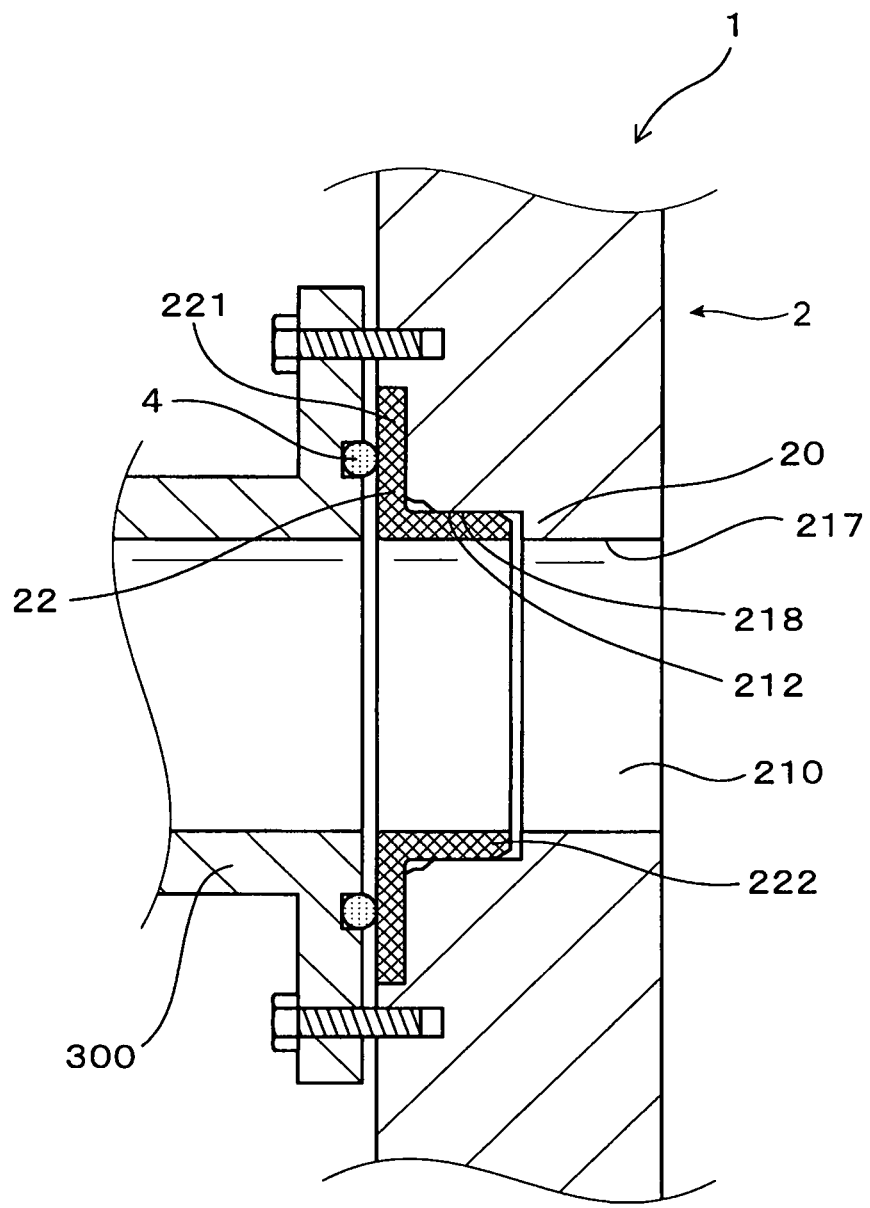
FIG. 12 is an enlarged cross-sectional view of a power conversion device according to a fifth embodiment, which passes through a corrosion-resistant portion.

In a fifth embodiment, as illustrated in FIG. 12, a pipe 300 with an internal flow path is fixed as a fixed member to the case 2. The pipe 300 may be intended, for example, to supply a refrigerant from the outside of the case 2 to a cooler for cooling heat-generating electronic components stored in a case 2 and discharge the refrigerant from the cooler in a case 2 to the outside of the case 2. In other respects, the pipe 300 may be intended, for example, to supply a gas from the outside to inside of the case 2 or discharge the gas from the inside to outside of the case 2.

The body through-hole 210 has a step portion 20 in which the rear side is smaller in inner diameter than the front side. The body through-hole 210 has the step portion 20 in which the rear side is smaller in inner diameter than the front side. The corrosion-resistant portion 22 is fitted into the front side of the step portion 20 in the body through-hole 210. In the fifth embodiment, the body through-hole 210 has a small-diameter portion 217 and a large-diameter portion 218. The small-diameter portion 217 is formed on the rear side of the step portion 20 and opened to the rear side. The small-diameter portion 217 is constant in inner diameter in the longitudinal direction X. The large-diameter portion 218 is formed on the front side of the step portion 20 and opened to the front side. The large-diameter portion 218 is constant in inner diameter in the longitudinal direction X. The large-diameter portion 218 is larger in inner diameter than the small-diameter portion 217. The corrosion-resistant portion 22 is fitted into the large-diameter portion 218. In the fifth embodiment, the corrosion-resistant portion 22 is press-fitted into the large-diameter portion 218. That is, at least part of the large-diameter portion 218 constitutes the press-fit hole portion 212.

The inner diameter of the rear side of the step portion 20 in the body through-hole 210 is equal to the inner diameter of the corrosion-resistant portion 22. That is, the inner diameter of the large-diameter portion 218 is equal to the inner diameter of the corrosion-resistant portion 22.

Accordingly, the inner peripheral surface of the large-diameter portion 218 and the inner peripheral surface of the corrosion-resistant portion 22 are formed substantially flush with each other. The back end surface of the corrosion-resistant portion 22 is opposed to the step portion 20.

In other respects, the fifth embodiment is identical to the fourth embodiment.

In the fifth embodiment, the corrosion-resistant portion 22 is fitted into the front side of the step portion 20 in the body through-hole 210. Therefore, it is easy to suppress large changes in the inner diameter of the corrosion-resistant portion 22 and the inner diameter of a portion of the body through-hole 210 on the rear side of the corrosion-resistant portion 22. This makes it possible to suppress fluctuations in the cross sectional area of a flow path between the corrosion-resistant portion 22 and the portion of the body through-hole 210 on the rear side of the corrosion-resistant portion 22. Therefore, in a case where the fixed member is the pipe 300 and the inside of the corrosion-resistant portion 22 and the body through-hole 210 is used as a flow path of a fluid as in the fifth embodiment, it is possible to suppress increase in the pressure loss of the fluid. In addition, in the fifth embodiment, the inner diameter of the body through-hole 210 on the rear side of the step portion 20 is equal to the inner diameter of the corrosion-resistant portion 22. Accordingly, it is possible to further suppress increase in the pressure loss of the fluid.

Other features of the fifth embodiment provide the same operations and effects as those of the fourth embodiment.

Sixth Embodiment

Figure 13:
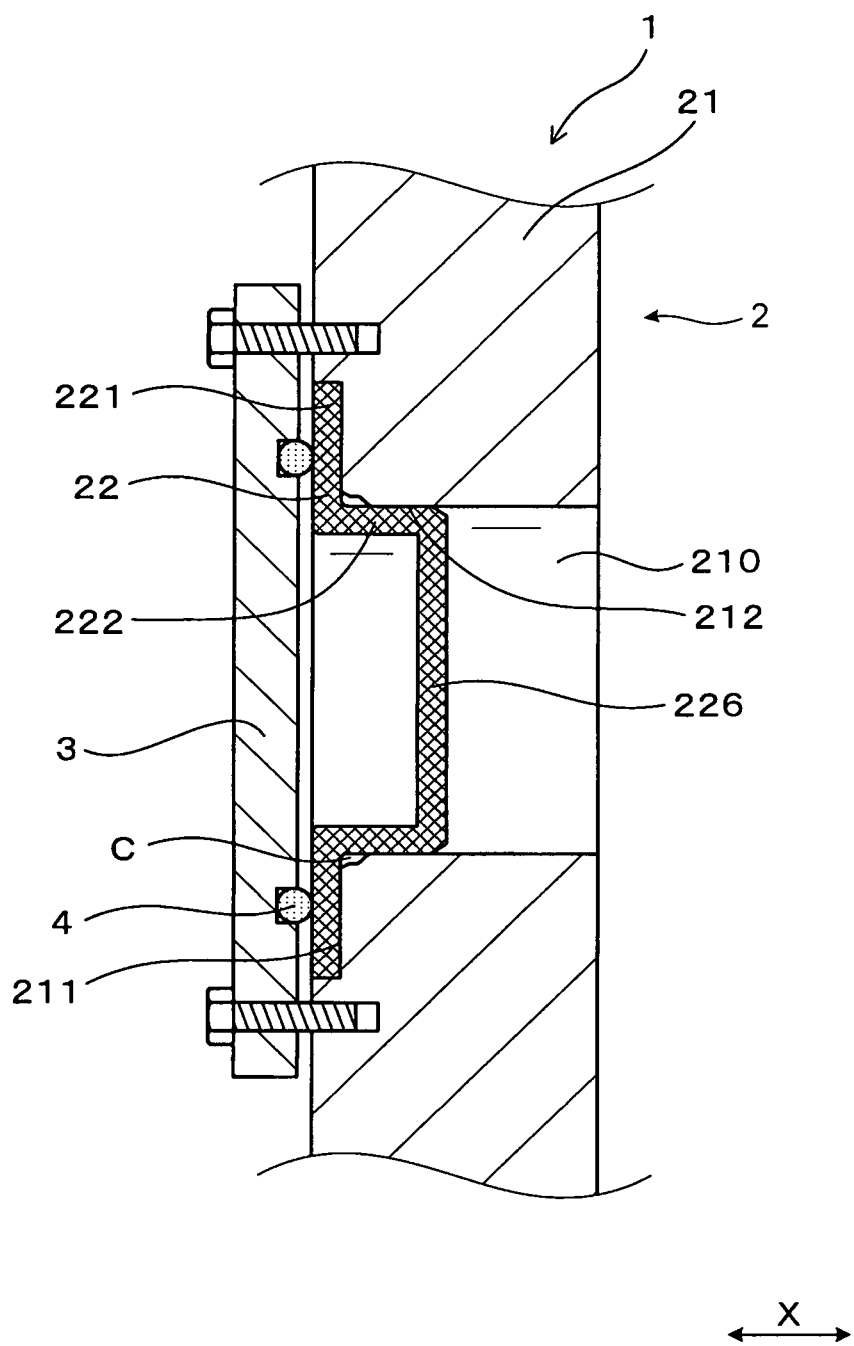
FIG. 13 is an enlarged cross-sectional view of a power conversion device according to a sixth embodiment, which passes through a corrosion-resistant portion.
Figure 14:
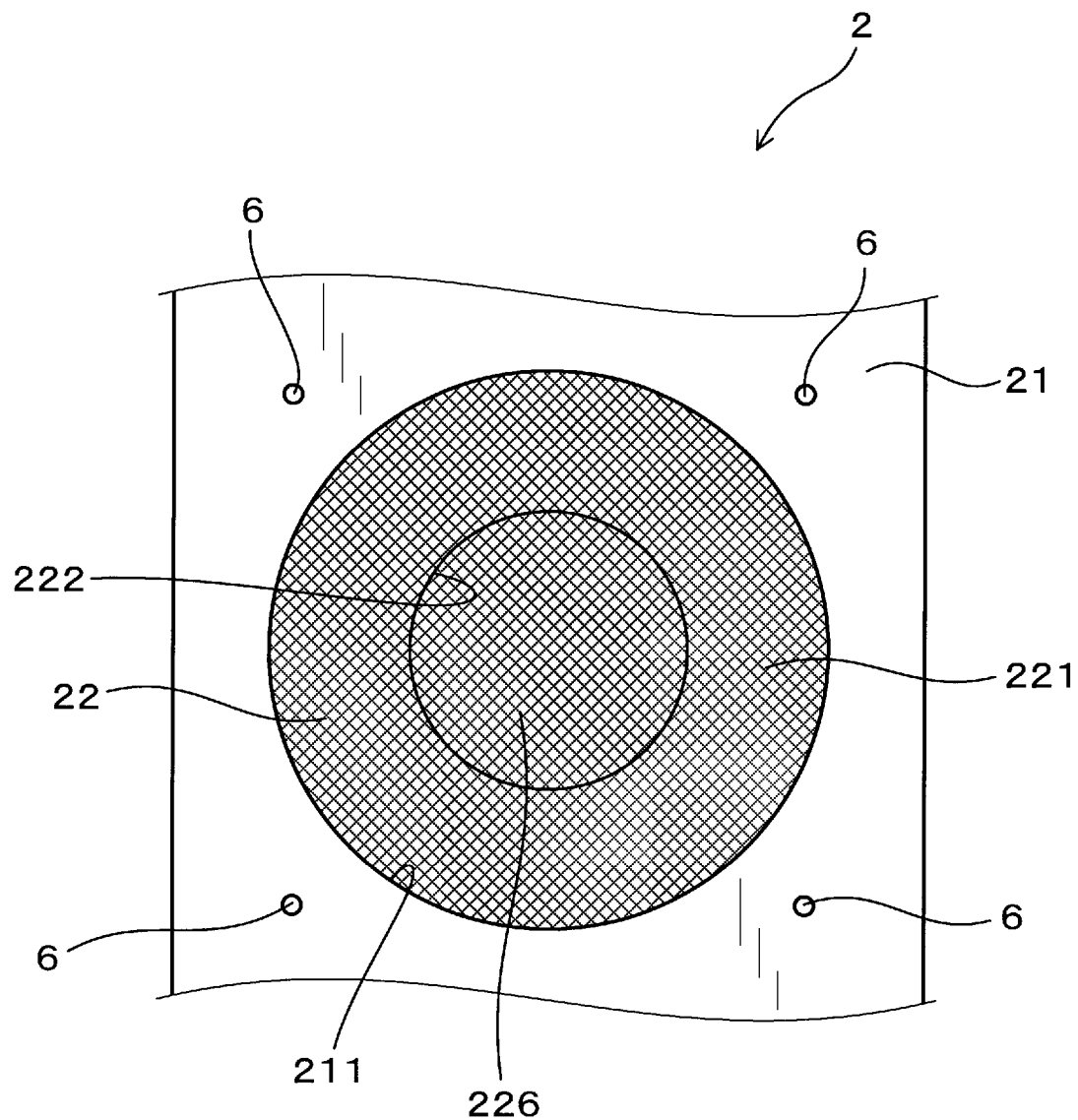
FIG. 14 is a diagram illustrating the corrosion-resistant portion and its surroundings as the case is seen from the front side according to the sixth embodiment.
Figure 15:
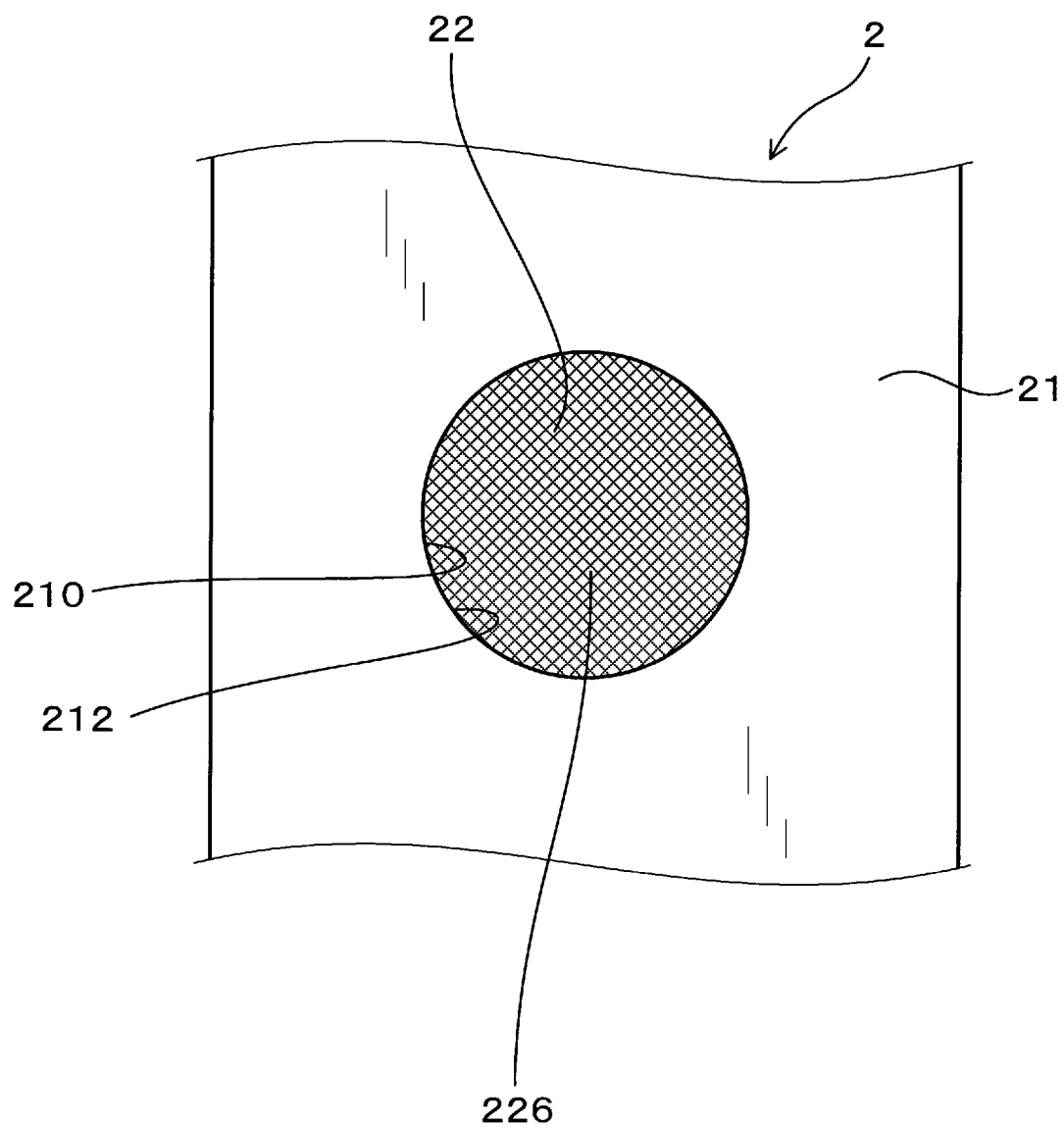
FIG. 15 is a diagram illustrating the corrosion-resistant portion and its surroundings as the case is seen from the rear side according to the sixth embodiment.

In a sixth embodiment, as illustrated in FIGS. 13 to 15, the shape of the corrosion-resistant portion 22 in the fourth embodiment is changed. Specifically, the extension portion 222 of the corrosion-resistant portion 22 has a block plate portion 226 that is formed to block the back end of the extension portion 222. As illustrated in FIG. 13, the corrosion-resistant portion 22 is press-fitted into the press-fit hole portion 212 of the extension portion 222. In this way, in the sixth embodiment, the region of the corrosion-resistant portion 22 press-fitted into the press-fit hole portion 212 is shaped with a recessed front surface. That is, the extension portion 222 has the concave front surface recessed toward the rear side.

In other respects, the sixth embodiment is identical to the fourth embodiment.

In the sixth embodiment, the block plate portion 226 can enhance the strength of the corrosion-resistant portion 22. Therefore, the durability of the corrosion-resistant portion 22 can be ensured even when the corrosion-resistant portion 22 is press-fitted into the press-fit hole portion 212. Further, in the sixth embodiment, the region of the corrosion-resistant portion 22 press-fitted into the press-fit hole portion 212 has the recessed front surface, thereby suppressing excessive increase in the strength of the corrosion-resistant portion 22. This prevents excessive application of various kinds of stress from the corrosion-resistant portion 22 to the case body 21. Therefore, it is also possible to ensure the durability of the case body 21. That is, in the sixth embodiment, it is possible to ensure both the durability of the corrosion-resistant portion 22 and the durability of the case body 21.

Other features of the sixth embodiment provide the same operations and effects as those of the fourth embodiment.

Seventh Embodiment

Figure 16:
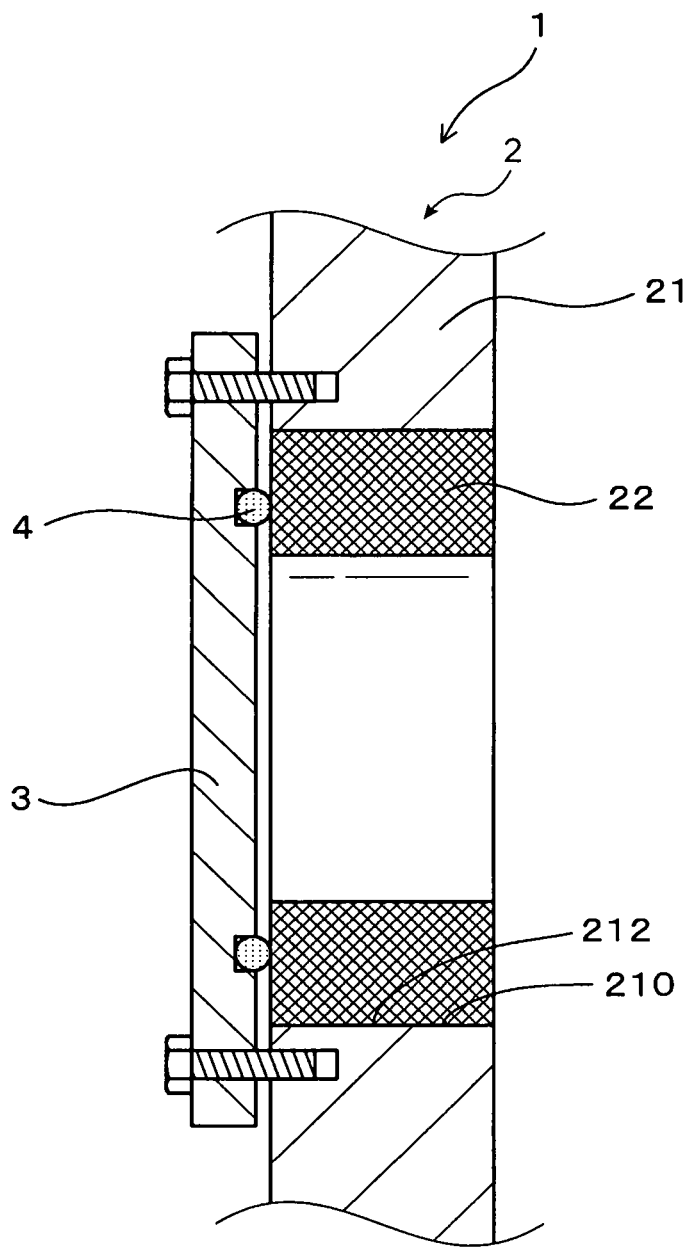
FIG. 16 is an enlarged cross-sectional view of a power conversion device according to a seventh embodiment, which passes through a corrosion-resistant portion.

In a sixth embodiment, as illustrated in FIG. 16, the manner of fixation and adhesion of the corrosion-resistant portion 22 to the case body 21 in the first embodiment is changed. The corrosion-resistant portion 22 is ring-shaped as seen from the longitudinal direction X. In the sixth embodiment, the dimension of the corrosion-resistant portion 22 in the longitudinal direction X is equal to the dimension of the body through-hole 210 in the longitudinal direction X.

In the seventh embodiment, the case body 21 does not have the annular concave portion of the first embodiment. The corrosion-resistant portion 22 is press-fitted into the body through-hole 210. The entire outer peripheral surface of the corrosion-resistant portion 22 is pressure-welded to and held on the entire inner peripheral surface of the body through-hole 210. That is, in the seventh embodiment, the entire body through-hole 210 constitutes the press-fit hole portion 212.

In other respects, the sixth embodiment is identical to the first embodiment.

In the seventh embodiment, the case body 21 is easy to form in a simple shape.

Other features of the seventh embodiment provide the same operations and effects as those of the first embodiment.

Eighth Embodiment

Figure 17:
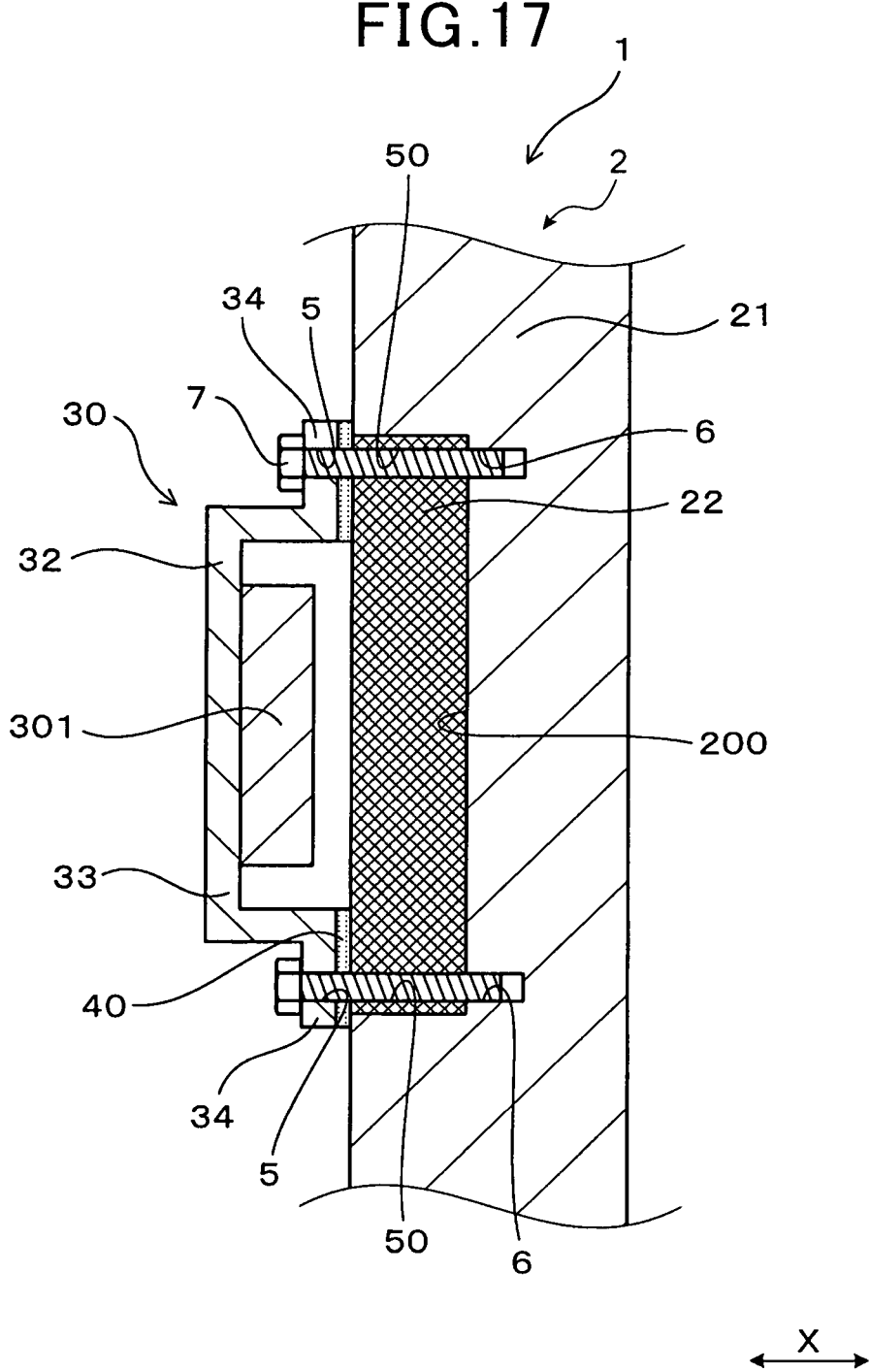
FIG. 17 is an enlarged cross-sectional view of a power conversion device according to an eighth embodiment, which passes through a corrosion-resistant portion.

In an eighth embodiment, as illustrated in FIG. 17, the fixed member is an external device 30 that has internally electronic components 301. The electronic components 301 include an ECU and various sensors, for example.

Figure 18:
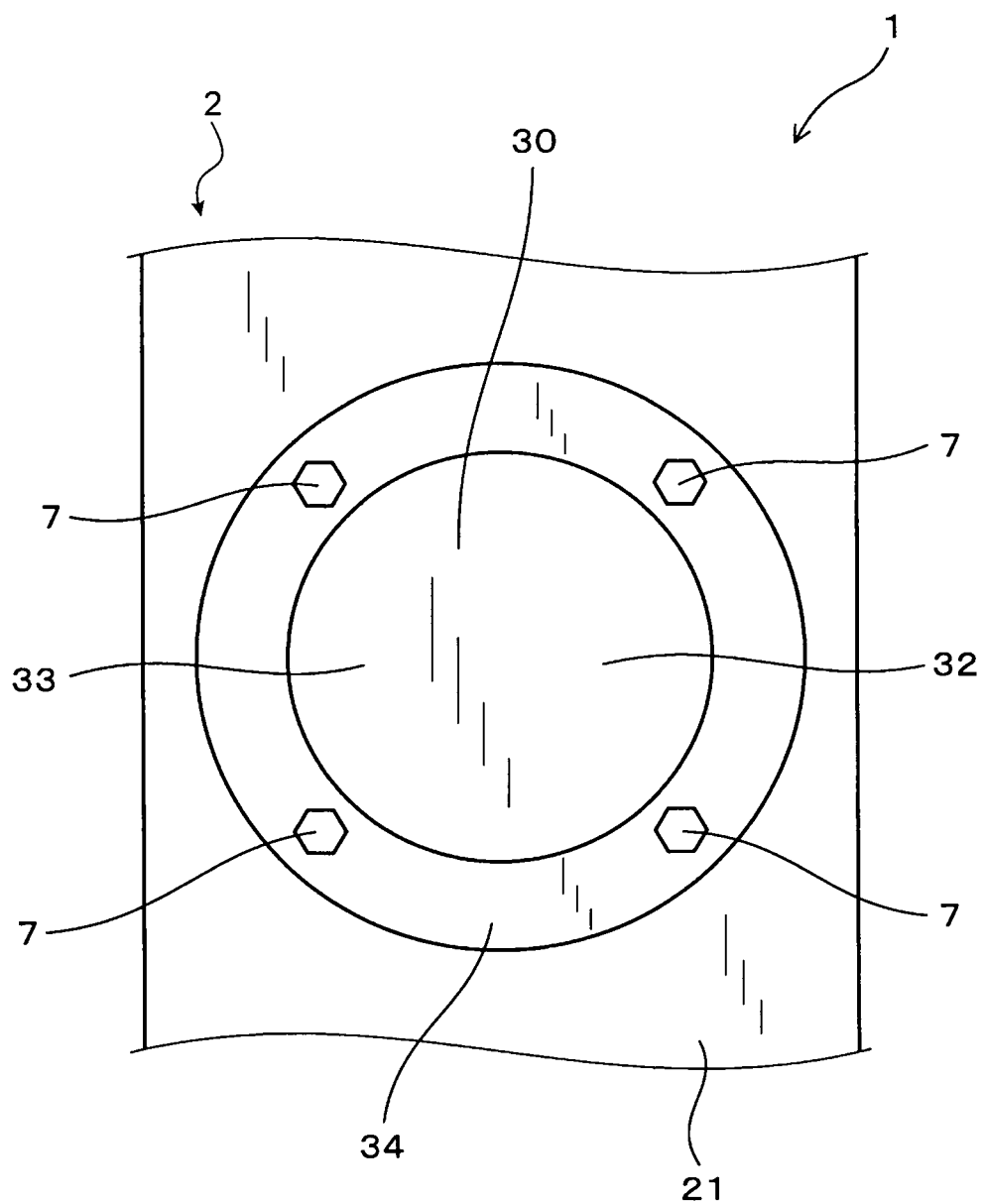
FIG. 18 is a diagram illustrating an external device and its surroundings as the power conversion device is seen from the front side according to the eighth embodiment.

The external device 30 has a device case 32 and the electronic components 301. The device case 32 is formed from a metal. As illustrated in FIGS. 17 and 18, the device case 32 has a device case body 33 that stores the electronic components 301 and is opened to the rear side and a flange portion 34 that extends from the back end of the device case body 33 to the outer peripheral side. As described later, the external device 30 is fastened to the case body 21 by bolts in the flange portion 34.

Figure 19:
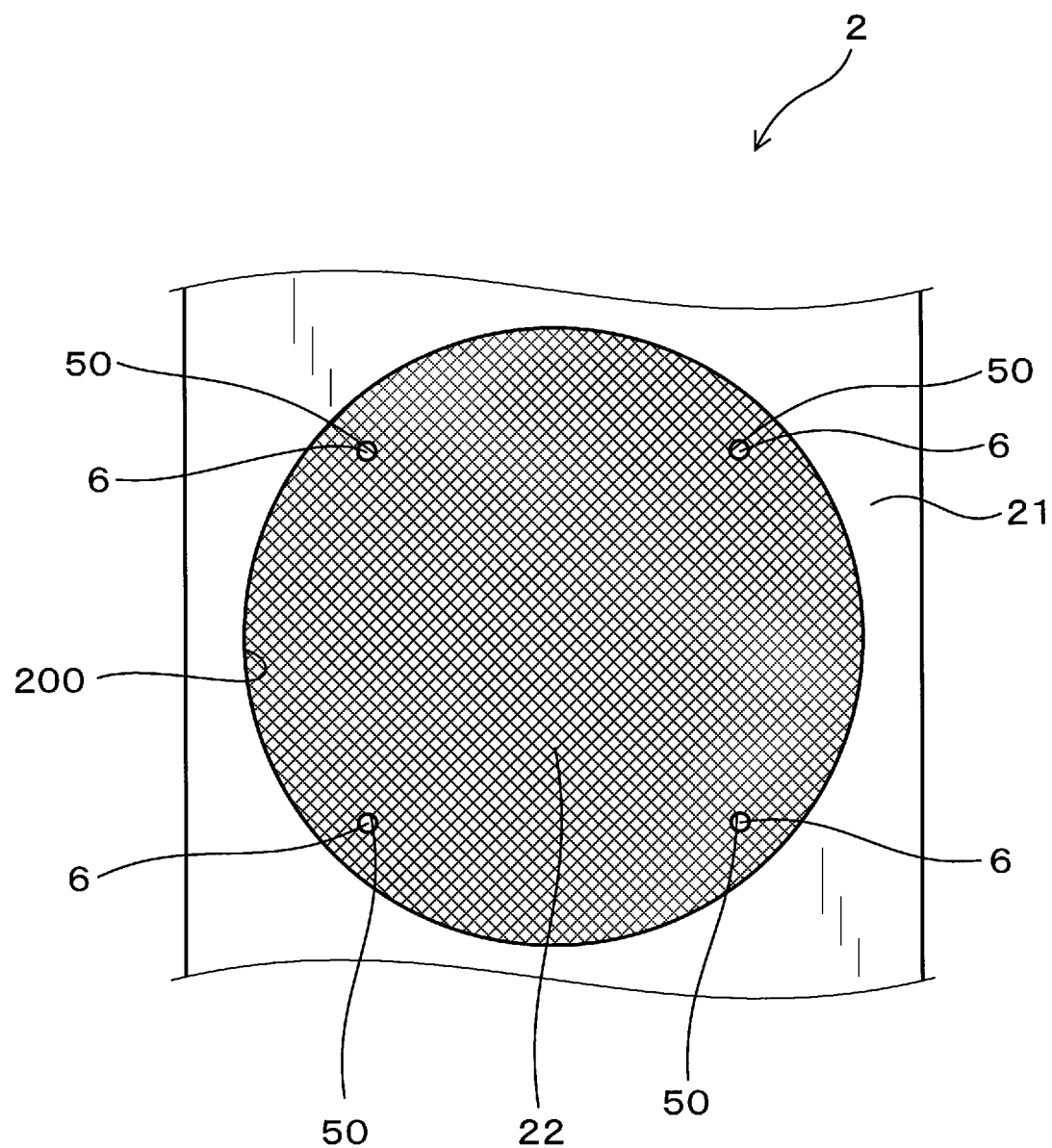
FIG. 19 is a diagram illustrating the corrosion-resistant portion and its surroundings as the case is seen from the front side according to the eighth embodiment.

In the eighth embodiment, the case body 21 does not have the body through-hole of the first embodiment and others. As illustrated in FIGS. 17 and 19, the case body 21 has a circular concave portion 200 that has a front surface recessed toward ward the rear side. The circular concave portion 200 is circular as seen from the front side. The corrosion-resistant portion 22 is fitted into the circular concave portion 200. The corrosion-resistant portion 22 has a disc shape with a thickness in the longitudinal direction X. The corrosion-resistant portion 22 is equal in outer shape to the circular concave portion 200.

In the eighth embodiment, bolt screwing holes 6 are formed in the circular concave portion 200 of the case body 21. The corrosion-resistant portion 22 has bolt insertion holes 50 positioned to overlap the bolt screwing holes 6 in the longitudinal direction X. The external device 30 is disposed such that the flange portion 34 is positioned to overlap the bolt screwing holes 6 in the case body 21 and the bolt insertion holes 50 in the corrosion-resistant portion 22 in the longitudinal direction X. A liquid gasket 40 as a seal member is disposed between the flange portion 34 and the corrosion-resistant portion 22. The bolt insertion holes 5 are formed in the flange portion 34 positioned to overlap the bolt screwing holes 6 in the case body 21 and the bolt insertion holes 50 in the corrosion-resistant portion 22 in the longitudinal direction X.

In the eighth embodiment, the external device 30 is fastened by bolts to the case body 21 together with the corrosion-resistant portion 22 of the case 2. The external device 30 is fastened and fixed to the case 2 by inserting the bolts 7 into the bolt insertion holes 5 in the external device 30 to penetrate the liquid gasket 40, then inserting into the bolt insertion holes 50 in the corrosion-resistant portion 22, and then screwing into the bolt screwing holes 6 in the case body 21. Accordingly, the external device 30 and the corrosion-resistant portion 22 are fastened together to the case body 21. The external device 30 is fixed to the corrosion-resistant portion 22 via the liquid gasket 40.

In other respects, the eighth embodiment is identical to the first embodiment.

In the eighth embodiment, it is possible to prevent decrease in sealing properties between the external device 30 and the case 2, thereby preventing the electronic components 301 stored in the external device 30 from becoming immersed in water.

The external device 30 is fastened to the case body 21 together with the corrosion-resistant portion 22. Accordingly, the axial force of the bolts 7 resulting from the bolt fastening is likely to transfer to the liquid gasket 40 between the external device 30 and the corrosion-resistant portion 22. Therefore, it is possible to further improve the sealing properties between the external device 30 and the case 2.

Other features of the eighth embodiment provide the same operations and effects as those of the first embodiment.

Ninth Embodiment

Figure 20:
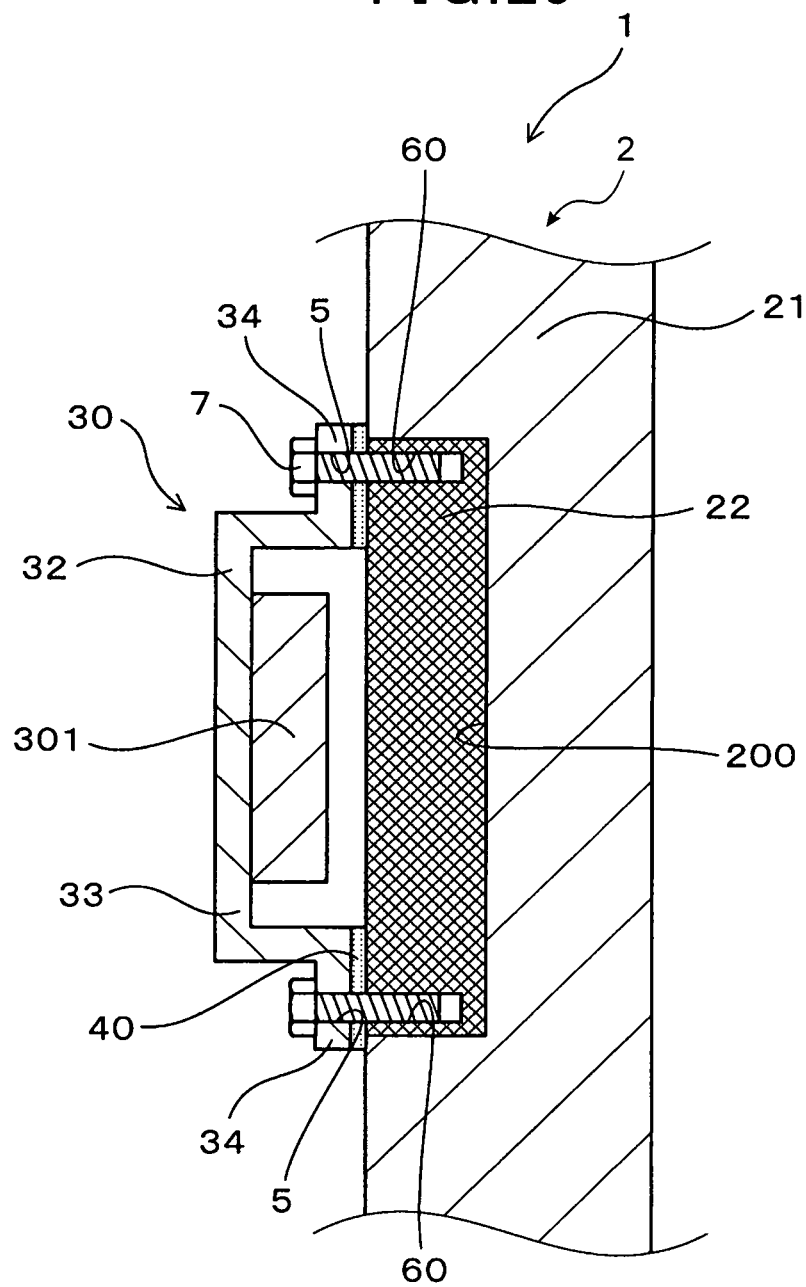
FIG. 20 is an enlarged cross-sectional view of a power conversion device according to a ninth embodiment, which passes through a corrosion-resistant portion.

In a ninth embodiment, as illustrated in FIG. 20, the basic configuration is similar to that of the eighth embodiment but the external device 30 is fastened and fixed to the corrosion-resistant portion 22.

Figure 21:
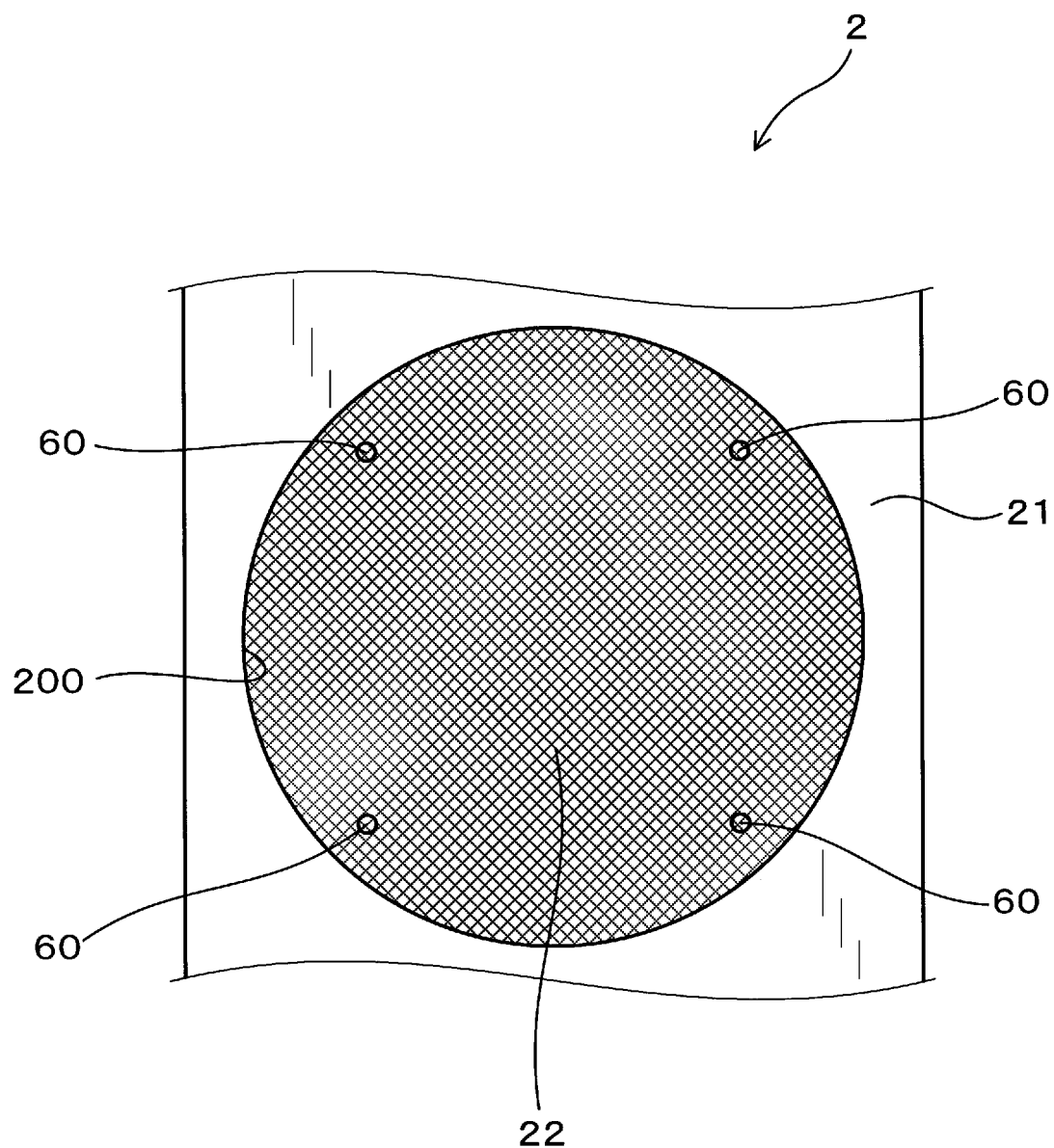
FIG. 21 is a diagram illustrating the corrosion-resistant portion and its surroundings as the case is seen from the front side according to the ninth embodiment.

As illustrated in FIGS. 20 and 21, in the ninth embodiment, the corrosion-resistant portion 22 has bolt screwing holes 60. As illustrated in FIG. 20, the external device 30 is disposed such that the flange portion 34 is positioned to overlap the bolt screwing holes 60 in the corrosion-resistant portion 22 in the longitudinal direction X. The flange portion 34 has the bolt insertion holes 5 positioned to overlap the bolt screwing holes 60 in the corrosion-resistant portion 22 in the longitudinal direction X. The external device 30 is fastened and fixed to the case 2 by inserting the bolts 7 into the bolt insertion holes 5, letting the bolts 7 penetrate the liquid gasket 40, and screwing into the bolt screwing holes 60 in the corrosion-resistant portion 22. Accordingly, the external device 30 is fastened and fixed to the corrosion-resistant portion 22 via the liquid gasket 40. In the ninth embodiment, the case body 21 has no bolt screwing holes or bolt insertion holes.

In other respects, the ninth embodiment is identical to the eighth embodiment.

In the ninth embodiment, the external device 30 is fastened by bolts to the bolt screwing holes 60 in the corrosion-resistant portion 22. Accordingly, the axial force of the bolts 7 resulting from the bolt fastening transfers directly to the liquid gasket 40 between the external device 30 and the corrosion-resistant portion 22. Therefore, it is possible to further improve the sealing properties between the external device 30 and the case 2. Further, in the ninth embodiment, the external device 30 is fastened by bolts to the corrosion-resistant portion 22, which makes it possible to fix the external device 30 to the case 2 without formation of bolt insertion holes or bolt screwing holes in the case body 21. Therefore, it is possible to reduce the manufacturing costs of the case 2.

Other features of the ninth embodiment provide the same operations and effects as those of the eighth embodiment.

Tenth Embodiment

Figure 22:
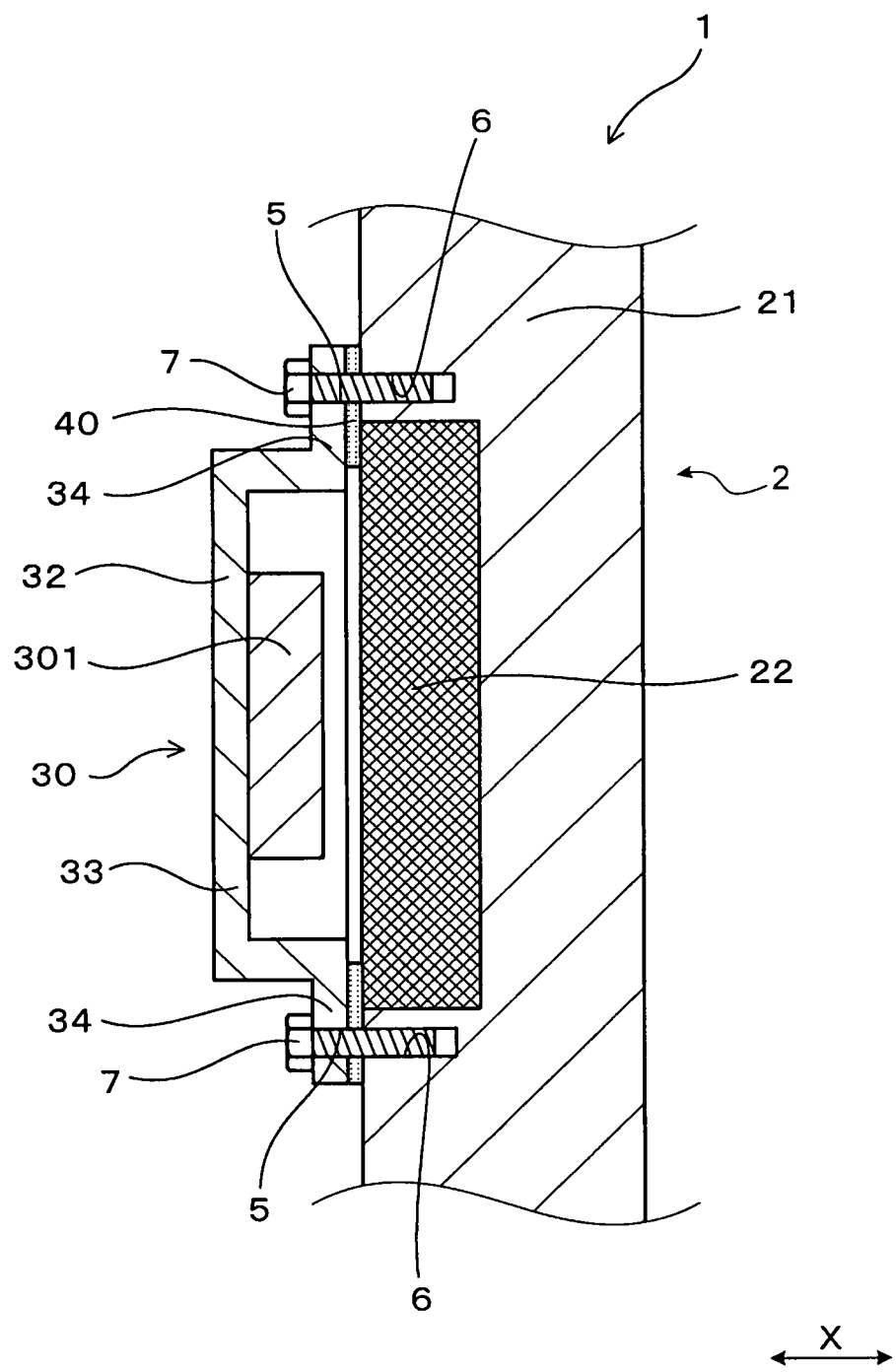
FIG. 22 is an enlarged cross-sectional view of a power conversion device according to a tenth embodiment, which passes through a corrosion-resistant portion.

In a tenth embodiment, as illustrated in FIG. 22, the formation positions of the bolt screwing holes 6 in the ninth embodiment are changed. In the tenth embodiment, the bolt screwing holes 6 are formed in the case body 21. Specifically, the bolt screwing holes 6 are formed in the case body 21 at positions adjacent to the outer peripheral side of the corrosion-resistant portion 22. The corrosion-resistant portion 22 has no bolt screwing holes or bolt insertion holes.

In the tenth embodiment, the external device 30 is disposed such that the flange portion 34 is positioned to overlap at least the bolt screwing holes 6 in the case body 21 in the longitudinal direction X and also overlap the corrosion-resistant portion 22 in the longitudinal direction X. The liquid gasket 40 is disposed between the flange portion 34 and the corrosion-resistant portion 22 and the case body 21.

In other respects, the tenth embodiment is identical to the ninth embodiment and provides the same operations and effects as those of the ninth embodiment.

Eleventh Embodiment

Figure 23:
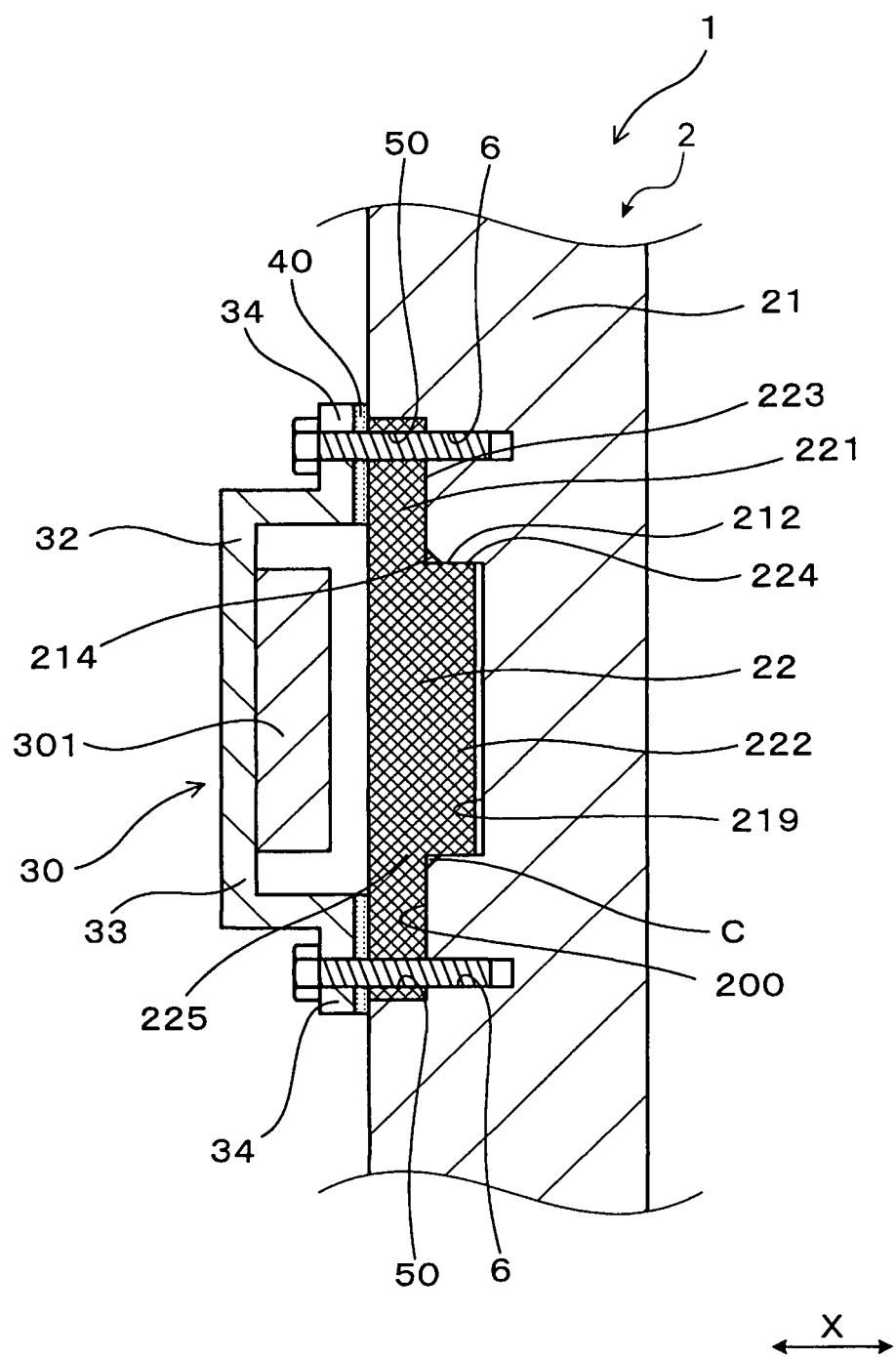
FIG. 23 is an enlarged cross-sectional view of a power conversion device according to an eleventh embodiment, which passes through a corrosion-resistant portion.

In an eleventh embodiment, as illustrated in FIG. 23, the shapes of the corrosion-resistant portion 22 and the case body 21 in the eighth embodiment are changed. The corrosion-resistant portion 22 has the plate-like portion 221 and the extension portion 222 extended from part of the plate-like portion 221 to the rear side. At least the back surface 223 of the plate-like portion 221 and the outer peripheral surface 224 of the extension portion 222 are in contact with the case body 21.

The plate-like portion 221 has a disc shape with a thickness in the longitudinal direction X. The extension portion 222 is extended from the center of the plate-like portion 221 toward the rear side. The extension portion 222 has a cylindrical shape.

The case body 21 has a fit concave portion 219 that is further recessed from the center of the circular concave portion 200 toward the rear side. The corrosion-resistant portion 22 has the plate-like portion 221 fitted into the circular concave portion 200 and the extension portion 222 fitted into the fit concave portion 219. The corrosion-resistant portion 22 has the extension portion 222 press-fitted into the fit concave portion 219. That is, at least part of the fit concave portion 219 constitutes the press-fit hole portion 212. The back surface 223 of the plate-like portion 221 is pressure-welded to the front surface of the circular concave portion 200.

As in the third embodiment, the case body 21 has the inclined portion 214 that is inclined with diameter increase from the front end of the press-fit hole portion 212 to the front side. The inclined portion 214 is coupled to the inner peripheral end edge of the fit concave portion 219. The inclined portion 214 is formed on the entire perimeter of the body through-hole 210. The clearance C is formed between the root portion 225 of the plate-like portion 221 and the extension portion 222 in the corrosion-resistant portion 22 and the inclined portion 214 of the case body 21.

In the eleventh embodiment, the bolt screwing holes 6 are formed in the circular concave portion 200. The bolt insertion holes 50 are formed in the plate-like portion 221 of the corrosion-resistant portion 22. As in the eighth embodiment, the external device 30 is fastened to the case body 21 together with the corrosion-resistant portion 22. Accordingly, in the eighth embodiment, the external device 30 is fixed to the corrosion-resistant portion 22 via the liquid gasket 40.

In other respects, the eleventh embodiment is identical to the eighth embodiment.

The eleventh embodiment provides the same operations and effects as those of the second, third, and eighth embodiments.

Twelfth Embodiment

Figure 24:
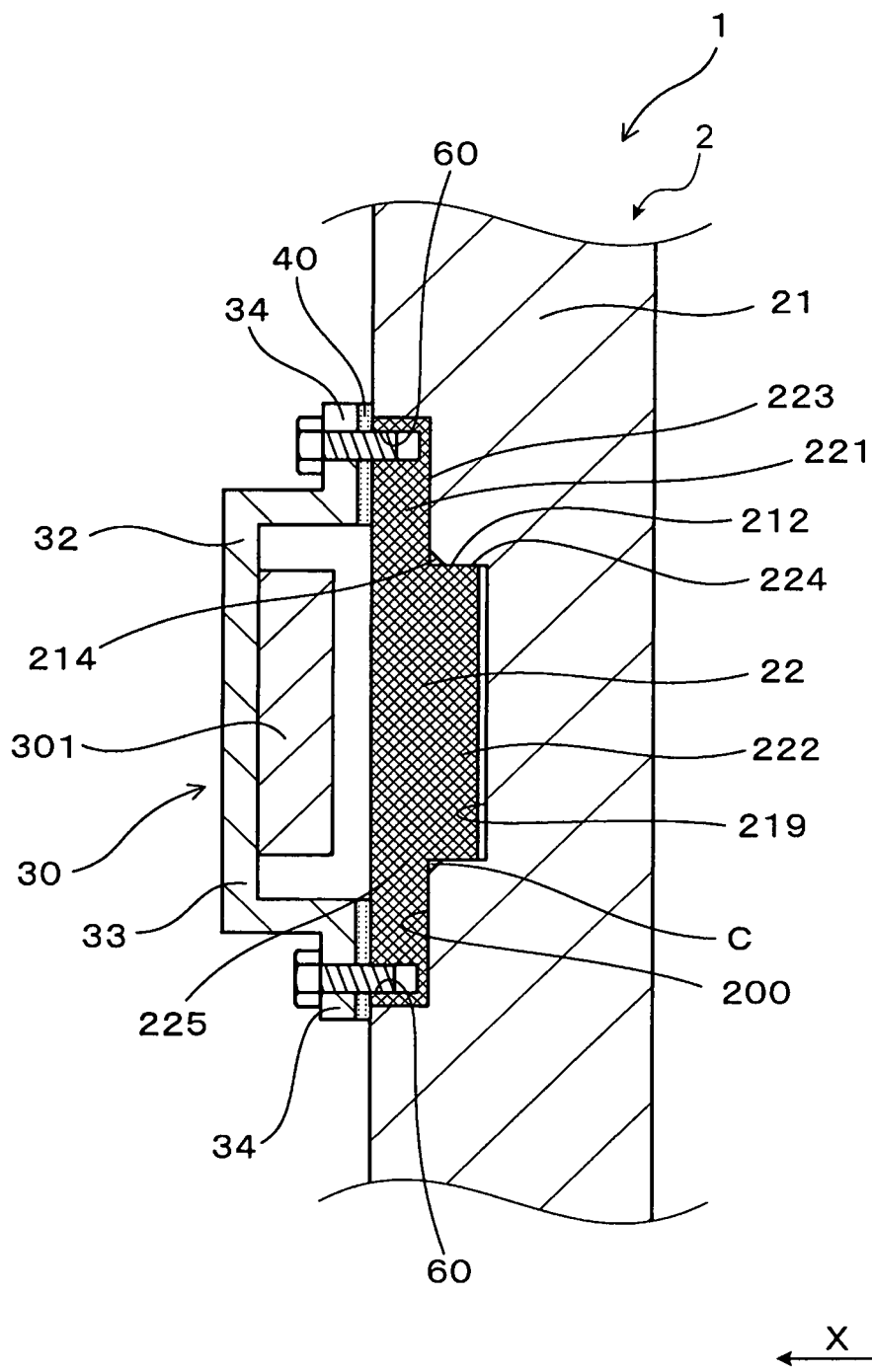
FIG. 24 is an enlarged cross-sectional view of a power conversion device according to a twelfth embodiment, which passes through a corrosion-resistant portion.

In a twelfth embodiment, as illustrated in FIG. 24, the basic configuration is the same as that of the eleventh embodiment but the bolt insertion holes in the corrosion-resistant portion 22 are the bolt screwing holes 60. That is, the bolt screwing holes 60 are formed in the plate-like portion 221 of the corrosion-resistant portion 22. As in the ninth embodiment, the external device 30 is fastened and fixed to the corrosion-resistant portion 22. Accordingly, as in the ninth embodiment, the external device 30 is fixed to the corrosion-resistant portion 22 via the liquid gasket 40. In the twelfth embodiment, the case body 21 has no bolt screwing holes or bolt insertion holes.

In other respects, the twelfth embodiment is identical to the eleventh embodiment and provides the same operations and effects as those of the ninth and the eleventh embodiments.

Thirteenth Embodiment

Figure 25:
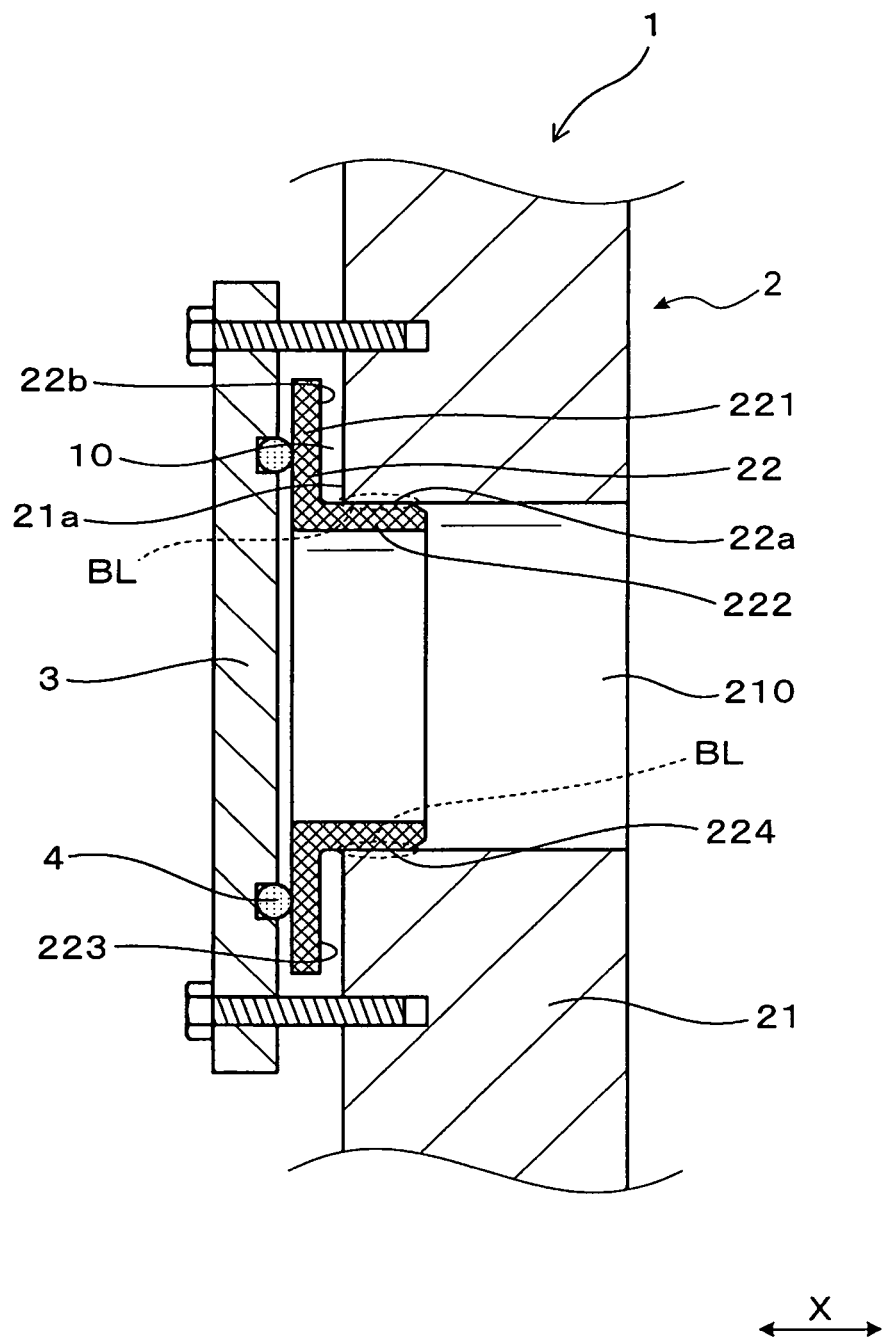
FIG. 25 is an enlarged cross-sectional view of a power conversion device according to a thirteenth embodiment, which passes through a corrosion-resistant portion.
Figure 26:
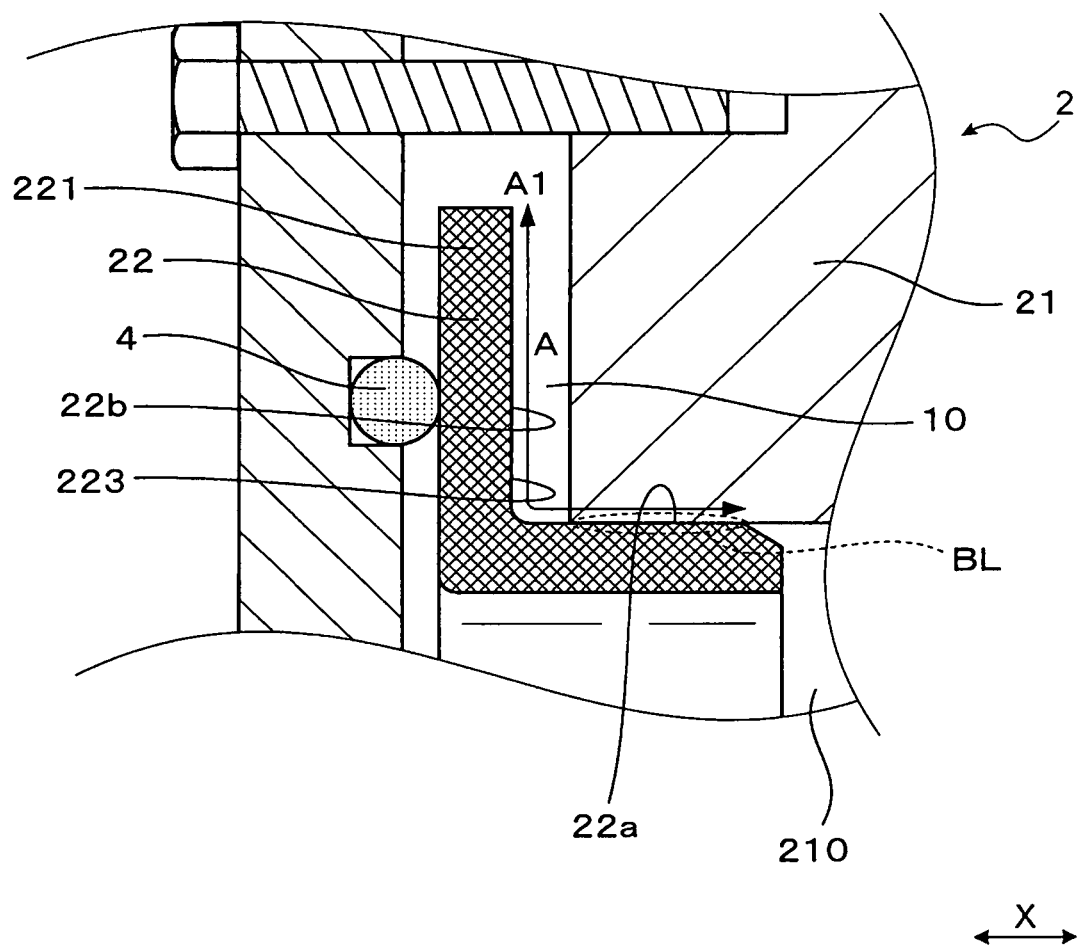
FIG. 26 is an enlarged schematic view of a joint surface and its vicinity illustrated in FIG. 25, which is used for describing a creepage direction and joint surface outside.

A thirteenth embodiment, as illustrated in FIGS. 25 and 26, is devised to suppress application of the force of foreign matter accumulated between the corrosion-resistant portion 22 and the case body 21 to the corrosion-resistant portion 22. Examples of the foreign matter include corrosion products and crystals of an externally adhered aqueous solution promoting corrosion (for example, salt crystals). The corrosion product results from the adhering of such an aqueous solution as described above to the case body 21 from the outside of the case 2, for example. For example, rust is a corrosion product. According to the thirteenth embodiment, it is possible to suppress the deformation of the corrosion-resistant portion 22 and the fluctuation of position of the corrosion-resistant portion 22 with respect to the case body 21 due to the accumulation of foreign matter.

As illustrated in FIG. 25, as in the second embodiment, the case body 21 has the body through-hole 210 penetrating the case body 21. On the other hand, in the thirteenth embodiment, the case body 21 does not have the annular concave portion of the second embodiment. In addition, in the thirteenth embodiment, the corrosion-resistant portion 22 has the same structure as that in the second embodiment. That is, the corrosion-resistant portion 22 has the plate-like portion 221 that is ring-shaped as seen from the longitudinal direction X and has a thickness in the longitudinal direction X and the cylindrical extension portion 222 that is extended backward from part of the plate-like portion 221.

The corrosion-resistant portion 22 is press-fitted or bonded to the case body 21. The surface of the corrosion-resistant portion 22 has a joint surface 22a and an outside opposed surface 22b. The joint surface 22a is pressure-welded or bonded to the case body 21. Therefore, no water enters between the joint surface 22a and the case body 21 from the outside of the case 2. In the thirteenth embodiment, the joint surface 22a is part of the outer peripheral surface 224 of the extension portion 222 in the corrosion-resistant portion 22. In FIG. 25 and the subsequent drawings, for the sake of convenience, the region where the joint surface 22a and the case body 21 are pressure-welded or bonded is surrounded by broken lines BL. The bonding mentioned herein includes joining by an adhesive and joining by welding.

As illustrated in FIGS. 25 and 26, the outside opposed surface 22b is formed on a joint surface outside A1 that is more separated from the joint surface 22a of the corrosion-resistant portion 22 in a creepage direction A toward the outside of the case 2 than the joint surface 22a. The outside opposed surface 22b is opposed to the case body 21 without being pressure-welded or bonded to the case body 21. Therefore, when it is assumed that the joint surface 22a is not pressure-welded or bonded to the case body 21, water from the outside of the power conversion device 1 is more likely to enter the outside opposed surface 22b than the joint surface 22a. In the thirteenth embodiment, the outside opposed surface 22b constitutes the back surface 223 of the plate-like portion 221 in the corrosion-resistant portion 22. FIG. 26 schematically represents the creepage direction A by a double-headed arrow A.

At least part of the outside opposed surface 22b is opposed to the case body 21 via a deformation avoidance clearance 10 that suppresses deformation of the corrosion-resistant portion 22 due to the force exerted by foreign matter accumulated between the outside opposed surface 22b and the case body 21.

In the thirteenth embodiment, the corrosion-resistant portion 22 is positioned such that the plate-like portion 221 is separated forward from the front surface of the case body 21. As described above, the deformation avoidance clearance 10 is formed between the back surface 223 of the plate-like portion 221 constituting the outside opposed surface 22b and the case body 21.

The deformation avoidance clearance 10 has a predetermined or more volume such that it is possible to suppress exertion of the force of foreign matter accumulated between the outside opposed surface 22b and the case body 21 on the outside opposed surface 22b and the case body 21. That is, the deformation avoidance clearance 10 is designed to the size with which, even if foreign matter is generated and accumulated due to entry of an aqueous solution as described above between the case body 21 and the outside opposed surface 22b, the total volume of the accumulated foreign matter does not exceed the volume of the deformation avoidance clearance 10. Accordingly, even if foreign matter is generated and accumulated between the outside opposed surface 22b and the case body 21, the accumulated matter is kept within the deformation avoidance clearance 10, thereby suppressing exertion of the force of the accumulated matter on the outside opposed surface 22b and the case body 21.

In the thirteenth embodiment, the outside opposed surface 22b is opposed to the case body 21 via the deformation avoidance clearance 10 across half or more of its total area. In particular, in the thirteenth embodiment, the outside opposed surface 22b is opposed in its entirety to the case body 21 via the deformation avoidance clearance 10. The outside opposed surface 22b and the body opposed surface 21a that is part of the case body 21 and opposed to the outside opposed surface 22b are both orthogonal to the longitudinal direction X.

In the thirteenth embodiment, the length of the deformation avoidance clearance 10 as seen in the longitudinal direction X can be set to 1.5 mm or more. The length of the deformation avoidance clearance 10 as seen in the longitudinal direction X is preferably set to 2.0 mm or more. The length of the deformation avoidance clearance 10 as seen in the longitudinal direction X is not limited to this but can be designed as appropriate according to the situation where the power conversion device 1 is mounted. The length of the deformation avoidance clearance 10 as seen in the longitudinal direction X is preferably as short as possible from the point of view of miniaturization of the power conversion device 1. For example, the length of the deformation avoidance clearance 10 as seen in the longitudinal direction X can be set to 5 mm or less.

In other respects, the thirteenth embodiment is identical to the second embodiment.

In the thirteen embodiment, the deformation avoidance clearance 10 is formed with a size capable of accommodating sufficiently accumulated matter between the outside opposed surface 22b and the case body 21. Therefore, even if foreign matter is accumulated in the deformation avoidance clearance 10 between the outside opposed surface 22b and the case body 21, it is possible to suppress exertion of the force of the accumulated foreign matter on the plate-like portion 221 constituting the outside opposed surface 22b of the corrosion-resistant portion 22. Therefore, it is possible to suppress deformation or displacement of the corrosion-resistant portion 22 due to the force exerted by foreign matter. Suppressing the deformation of the corrosion-resistant portion 22 leads to improvement in the sealing properties on the inside and outside of the case 2. That is, if the plate-like portion 221 of the corrosion-resistant portion 22 becomes deformed or displaced, the region of the plate-like portion 221 in contact with the O-ring 4 will also become displaced. In such a case, the compression ratio of the O-ring 4 may change and deteriorate the sealing properties on the inside and outside of the case 2. That is, in the thirteenth embodiment, suppressing the deformation and displacement of the corrosion-resistant portion 22 makes it possible to improve the sealing properties on the inside and outside of the case 2.

Other features of the thirteenth embodiment provide the same operations and effects as those of the second embodiment.

Fourteenth Embodiment

Figure 27:
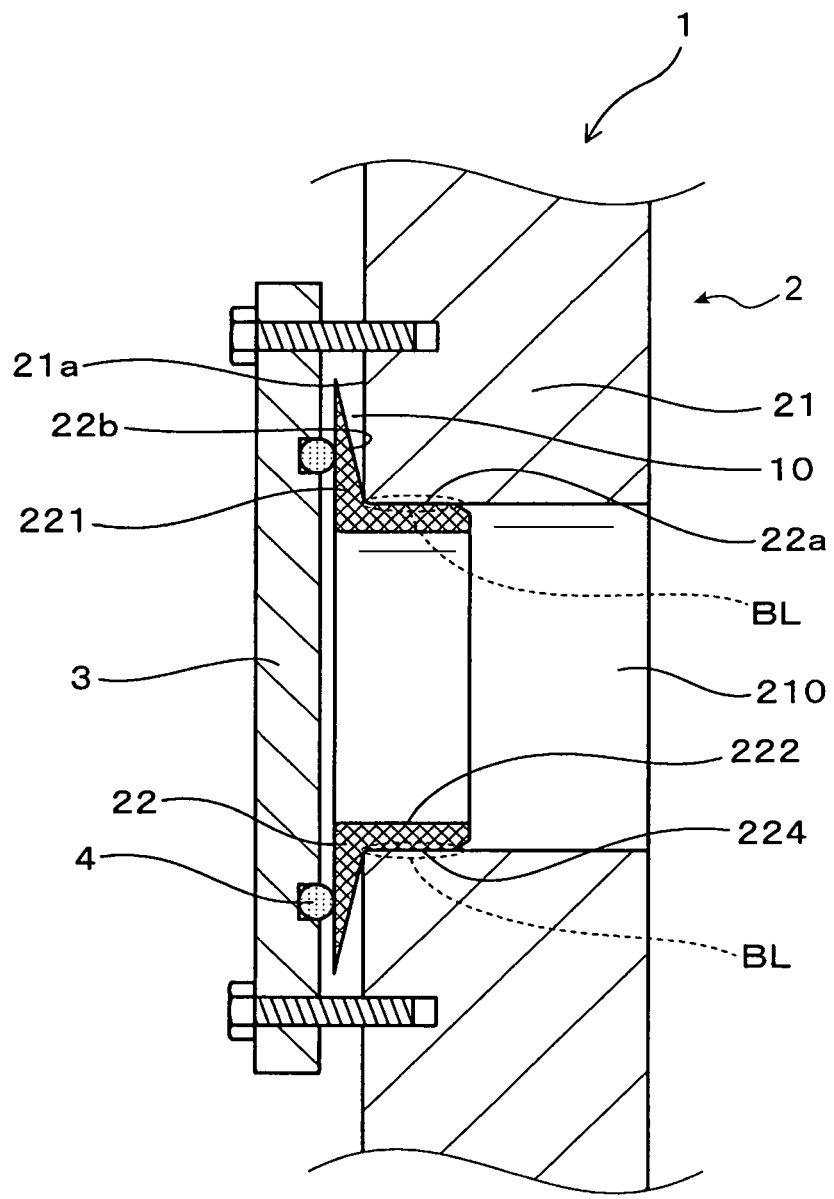
FIG. 27 is an enlarged cross-sectional view of a power conversion device according to a fourteenth embodiment, which passes through a corrosion-resistant portion.

In a fourteenth embodiment, as illustrated in FIG. 27, the outside opposed surface 22b and the body opposed surface 21a of the case body 21 are relatively inclined such that the deformation avoidance clearance 10 becomes wider with increasing proximity to the joint surface outside in the creepage direction of the corrosion-resistant portion 22. In the fourteenth embodiment, the outside opposed surface 22b is inclined with respect to a plane orthogonal to the longitudinal direction X. That is, the outside opposed surface 22b is inclined forward in the longitudinal direction X with increasing proximity to the outer peripheral side. The body opposed surface 21a that is part of the case body 21 and opposed to the outside opposed surface 22b is formed in parallel to a plane orthogonal to the longitudinal direction X. The inner peripheral end edge of the outside opposed surface 22b is in abutment with the inner peripheral end edge of the body opposed surface 21a. The dimension between the outer peripheral end edge of the outside opposed surface 22b and the body opposed surface 21a as seen in the longitudinal direction X can be set to 1.5 mm or more and is preferably set to 2.0 mm or more, but is not limited to this. The dimension between the outer peripheral end edge of the outside opposed surface 22b and the body opposed surface 21a as seen in the longitudinal direction X is preferably as short as possible from the point of view of miniaturization of the power conversion device 1. For example, the dimension between the outer peripheral end edge of the outside opposed surface 22b and the body opposed surface 21a as seen in the longitudinal direction X can be set to 5 mm or less.

In other respects, the fourteenth embodiment is identical to the thirteenth embodiment.

In the fourteenth embodiment, it is possible to facilitate the assembly of the corrosion-resistant portion 22 into the case body 21 and the formation of the deformation avoidance clearance 10. That is, in the fourteenth embodiment, pressing the corrosion-resistant portion 22 into the case body 21 side until the inner peripheral end edge of the outside opposed surface 22b of the corrosion-resistant portion 22 is brought into abutment with the body opposed surface 21a makes it possible to form the deformation avoidance clearance 10 and assemble the corrosion-resistant portion 22 into the case body 21.

Other features of the fourteenth embodiment provide the same operations and effects as those of the thirteenth embodiment.

Fifteenth Embodiment 15

Figure 28:
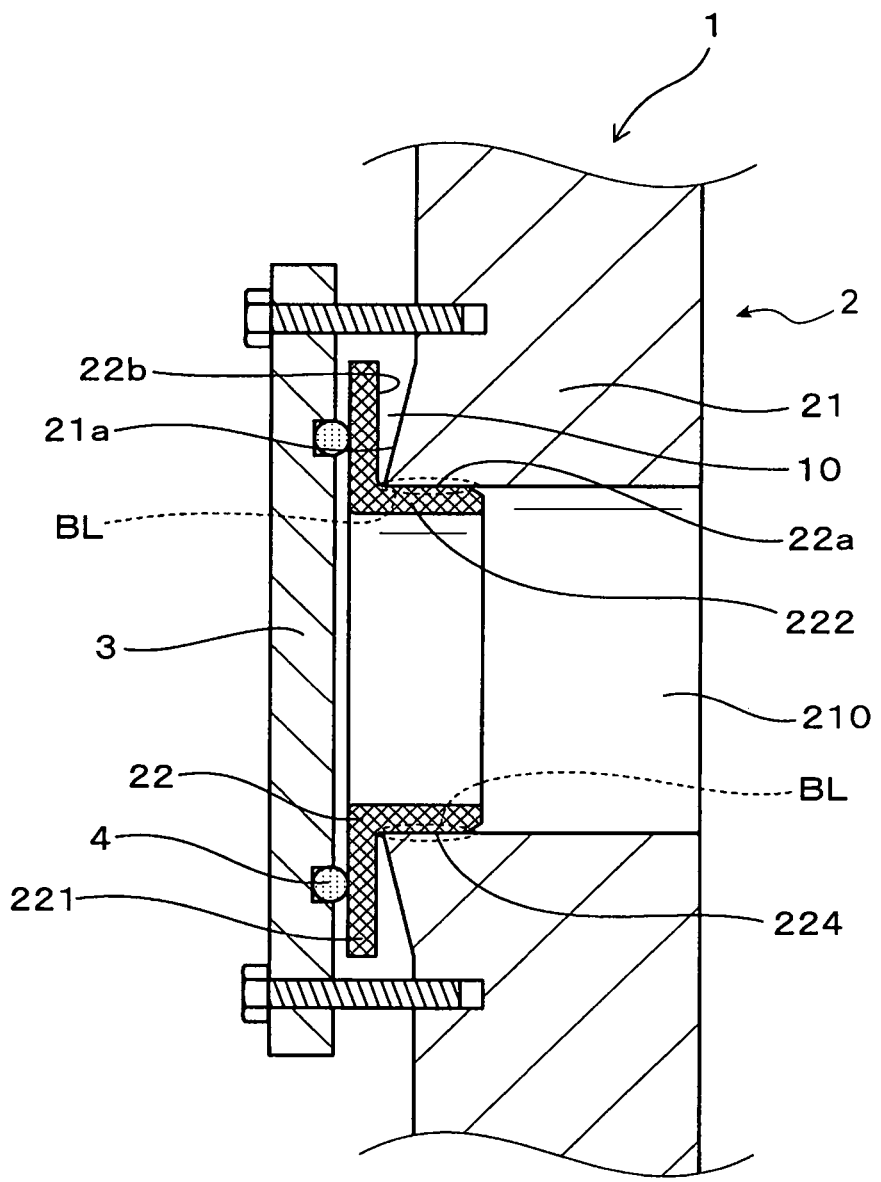
FIG. 28 is an enlarged cross-sectional view of a power conversion device according to a fifteenth embodiment, which passes through a corrosion-resistant portion.

In a fifteenth embodiment, as illustrated in FIG. 28, as in the fourteenth embodiment, the outside opposed surface 22b of the corrosion-resistant portion 22 and the body opposed surface 21a of the case body 21 are relatively inclined such that the deformation avoidance clearance 10 becomes wider with increasing proximity to the joint surface outside in the creepage direction of the corrosion-resistant portion 22. In the fifteenth embodiment, the body opposed surface 21a is inclined with respect to a plane orthogonal to the longitudinal direction X. That is, the body opposed surface 21a is inclined more backward with increasing proximity to the outer peripheral side. The outside opposed surface 22b of the corrosion-resistant portion 22 is formed in parallel to a plane orthogonal to the longitudinal direction X. The inner peripheral end edge of the outside opposed surface 22b is in abutment with the inner peripheral end edge of the body opposed surface 21a. The dimension between the outer peripheral end edge of the outside opposed surface 22b and the body opposed surface 21a as seen in the longitudinal direction X can be set to 1.5 mm or more and is preferably set to 2.0 mm or more, but is not limited to this. The dimension between the outer peripheral end edge of the outside opposed surface 22b and the body opposed surface 21a as seen in the longitudinal direction X is preferably as short as possible from the point of view of miniaturization of the power conversion device 1. For example, the dimension between the outer peripheral end edge of the outside opposed surface 22b and the body opposed surface 21a as seen in the longitudinal direction X can be set to 5 mm or less.

In other respects, the fifteenth embodiment is identical to the thirteenth embodiment.

The fifteenth embodiment provides the same operations and effects as those of the thirteenth and fourteenth embodiments.

Sixteenth Embodiment

Figure 29:
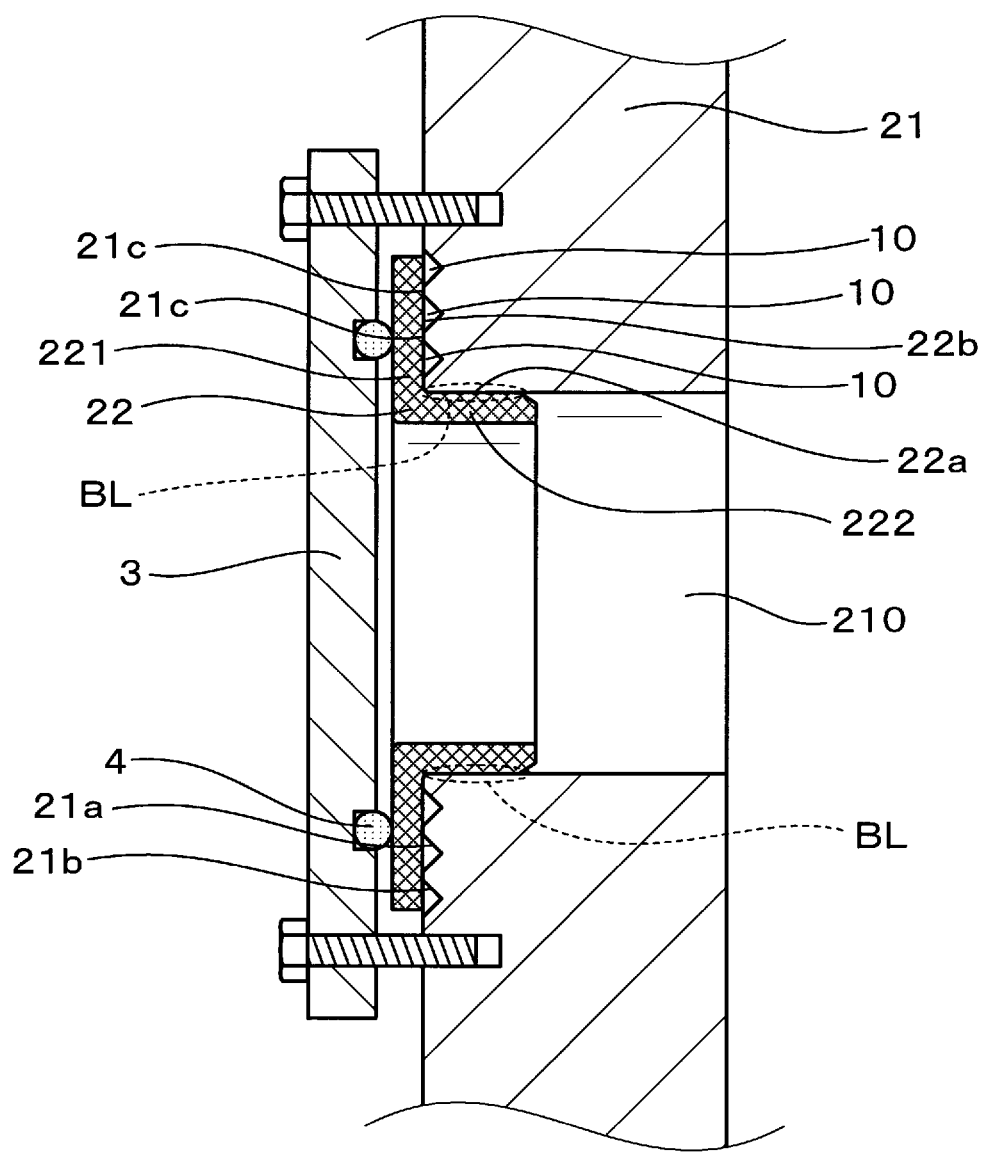
FIG. 29 is an enlarged cross-sectional view of a power conversion device according to a sixteenth embodiment, which passes through a corrosion-resistant portion.
Figure 30:
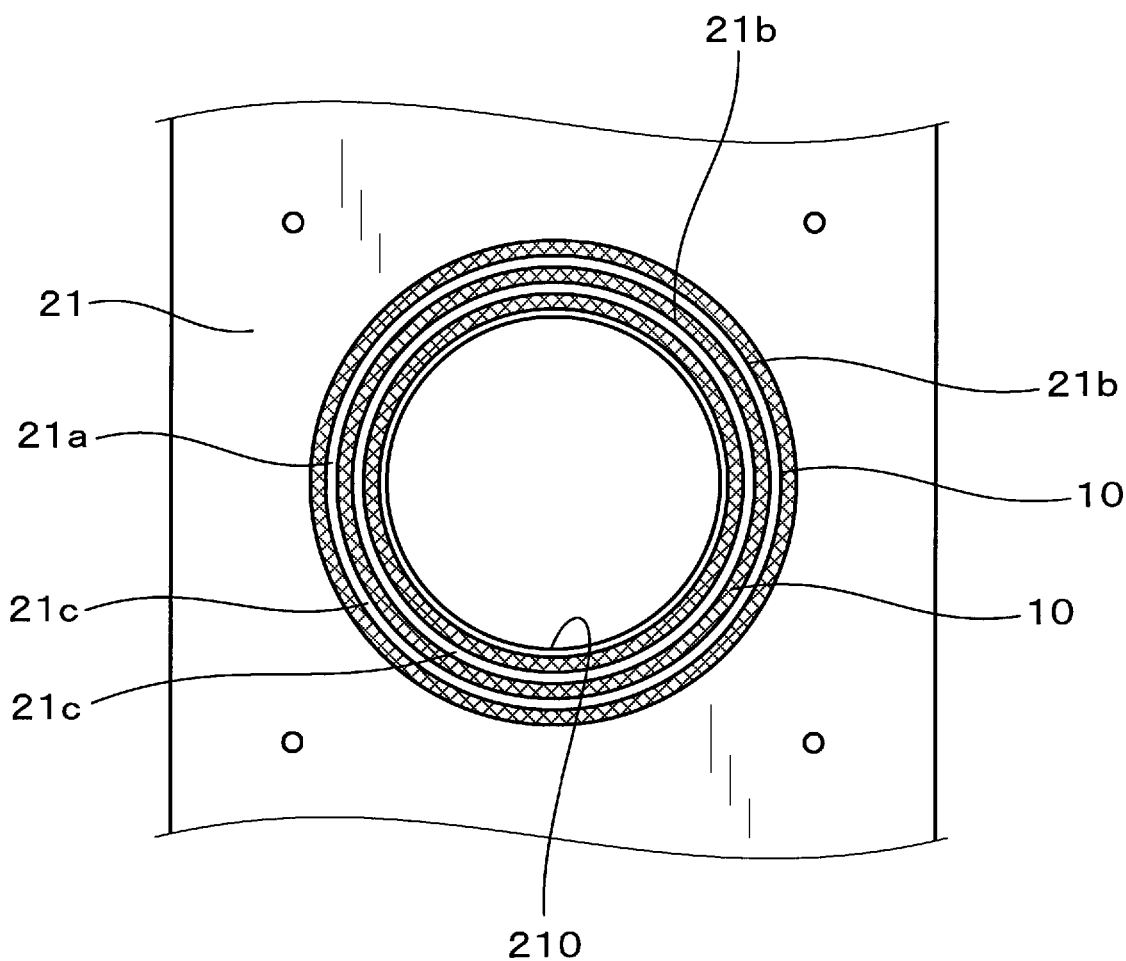
FIG. 30 is a diagram illustrating a body through-hole and its surroundings as the case body is seen from the front side according to the sixteenth embodiment.

In a sixteenth embodiment, as illustrated in FIG. 29, the deformation avoidance clearance 10 is formed from a groove 21b on at least one of the outside opposed surface 22b and the body opposed surface 21a. As illustrated in FIGS. 29 and 30, in the sixteenth embodiment, the groove 21b constituting the deformation avoidance clearance 10 is formed such that part of the front surface of the body opposed surface 21a is recessed toward the rear side. In the sixteenth embodiment, the groove 21b is formed in an annual shape to surround the body through-hole 210 from the outer peripheral side of the body through-hole 210. A plurality of grooves 21b is formed. The plurality of grooves 21b is aligned in a radial direction at constant intervals therebetween. The radial dimension of the grooves 21b is larger than the radial dimension of inter-groove regions 21c as regions between the radially adjacent grooves 21b on the body opposed surface 21a. The maximum dimension of the grooves 21b as seen in the longitudinal direction X can be set to 1.5 mm or more and is preferably set to 2.0 mm or more, but is not limited to this. The maximum dimension of the grooves 21b as seen in the longitudinal direction X is preferably as short as possible from the point of view of miniaturization of the power conversion device 1. For example, the maximum dimension of the grooves 21b as seen in the longitudinal direction X can be set to 5 mm or less. In FIG. 30, the grooves 21b are hatched for the sake of convenience.

As illustrated in FIG. 29, the corrosion-resistant portion 22 is disposed to cover the grooves 21b on the plate-like portion 221 from the front side of the grooves 21b. In the sixteenth embodiment, part of the outside opposed surface 22b is opposed to the case body 21 via the deformation avoidance clearance 10. In the sixteenth embodiment as well, the outside opposed surface 22b is opposed to the case body 21 via the deformation avoidance clearance 10 by half or more of its total area. That is, the outside opposed surface 22b is opposed to the case body 21 via the grooves 21b by half or more of its total area. The outside opposed surface 22b is in abutment with the inter-groove regions 21c on the body opposed surface 21a.

In other respects, the sixteenth embodiment is identical to the thirteenth embodiment.

The sixteenth embodiment provides the same operations and effects as those of the thirteenth to fifteenth embodiments.

In the sixteenth embodiment, the grooves 21b constituting the deformation avoidance clearance 10 are formed only on the body opposed surface 21a of the case body 21. Alternatively, the grooves 21b may be formed on part of the outside opposed surface 22b of the corrosion-resistant portion 22 and recessed toward the front side, or may be formed on both the body opposed surface 21a and the outside opposed surface 22b.

In the sixteenth embodiment, the grooves 21b are continuously formed in an annual shape on the entire outer periphery of the body through-hole 210, but are not limited to this. For example, the grooves 21b may be annular grooves that are intermittently formed in the peripheral direction on the outer peripheral side of the body through-hole 210. The grooves 21b are not limited to an annular shape but may be formed in a linear shape along one direction orthogonal to the longitudinal direction X, for example.

Seventeenth Embodiment

Figure 31:
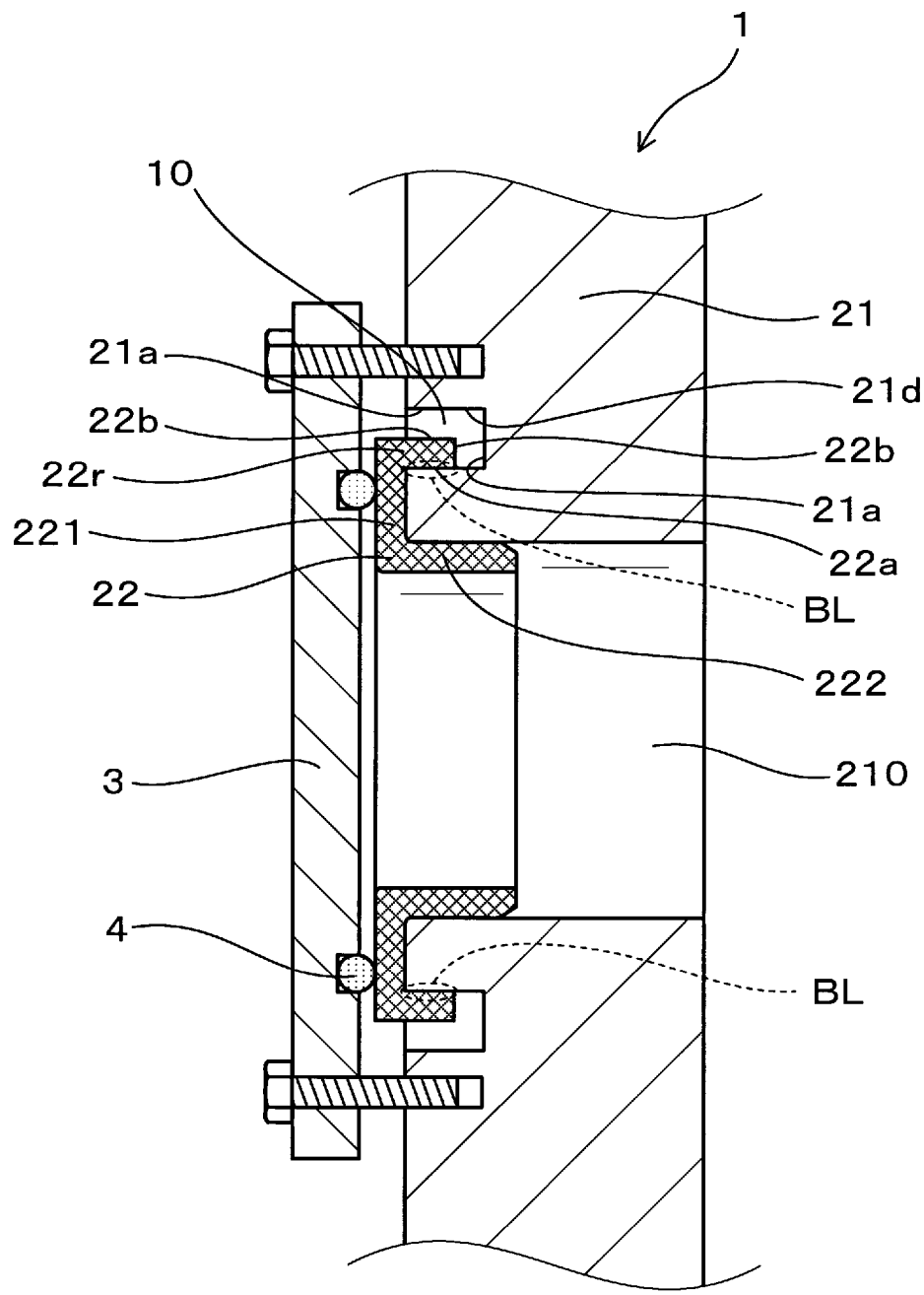
FIG. 31 is an enlarged cross-sectional view of a power conversion device according to a seventeenth embodiment, which passes through a corrosion-resistant portion.
Figure 32:
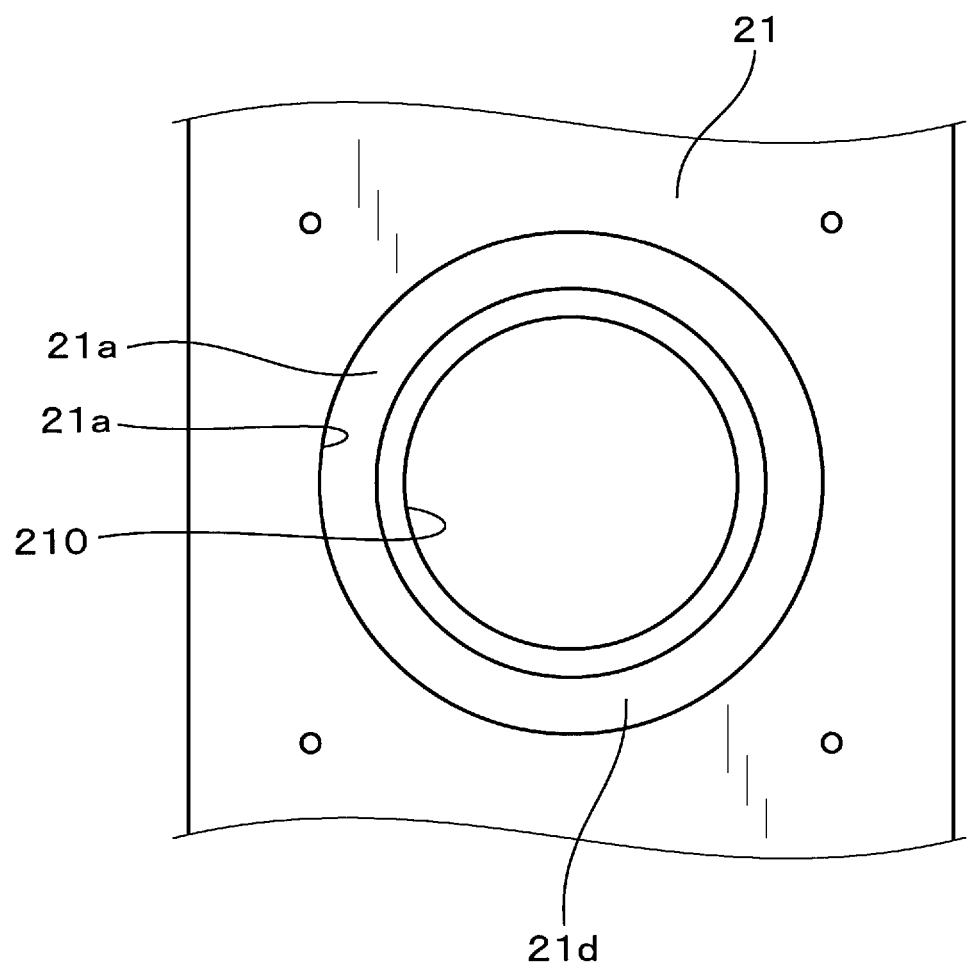
FIG. 32 is a diagram illustrating a body through-hole and its surroundings as the case body is seen from the front side according to the seventeenth embodiment.

In a seventeenth embodiment, as illustrated in FIG. 31, the shape of the case body 21 and the shape of the corrosion-resistant portion 22 in the thirteenth embodiment are modified to change the positions of the joint surface 22a and the outside opposed surface 22b. In the seventeenth embodiment, a cylindrical backward protrusion portion 22r protruding to the rear side is formed on the outer peripheral side of the plate-like portion 221. As illustrated in FIGS. 31 and 32, an engagement groove portion 21d is formed on the front surface of the case body 21 at a position separated from the body through-hole 210 to the outer peripheral side. The engagement groove portion 21d is formed in a groove shape such that the front surface of the case body 21 is recessed toward the rear side. As seen from the front side, the engagement groove portion 21d is formed in an annular shape to surround the body through-hole 210. As illustrated in FIG. 31, in the seventeenth embodiment, the corrosion-resistant portion 22 is bonded or pressure-welded to the inner peripheral surface of the engagement groove portion 21d on the inner peripheral surface of the backward protrusion portion 22r. That is, in the seventeenth embodiment, the inner peripheral surface of the backward protrusion portion 22r constitutes a joint surface 22a.

The back end surface of the backward protrusion portion 22r and part of the outer peripheral surface of the backward protrusion portion 22r are opposed to the case body 21 without being pressure-welded or bonded to the case body 21, closer to the joint surface outside as seen in the creepage direction of the corrosion-resistant portion 22 than the joint surface 22a. That is, the back end surface of the backward protrusion portion 22r and part of the outer peripheral surface of the backward protrusion portion 22r constitute the outside opposed surface 22b. A region of the engagement groove portion 21d in the case body 21 opposed to the back end surface of the backward protrusion portion 22r in the longitudinal direction X and a region of the engagement groove portion 21d in the case body 21 opposed to the outer peripheral surface of the backward protrusion portion 22r constitute the body opposed surface 21a. The deformation avoidance clearance 10 is formed between the outside opposed surface 22b and the body opposed surface 21a.

In the seventeenth embodiment, a region of the plate-like portion 221 in the corrosion-resistant portion 22 closer to the inner peripheral side than to the backward protrusion portion 22r may not be pressure-welded or bonded to the case body 21.

In other respects, the seventeenth embodiment is identical to the thirteenth embodiment.

The seventeenth embodiment provides the same operations and effects as those of the thirteenth embodiment.

Eighteenth Embodiment

Figure 33:
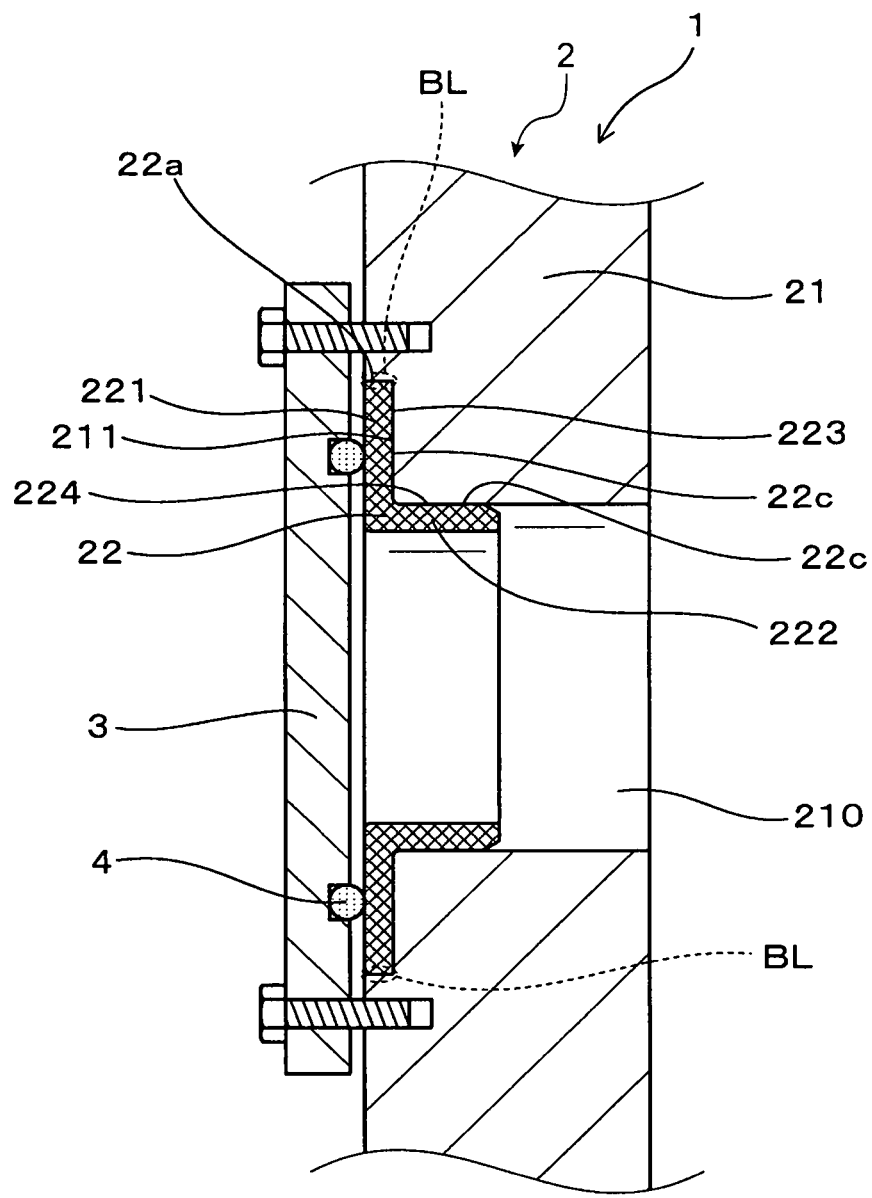
FIG. 33 is an enlarged cross-sectional view of a power conversion device according to an eighteenth embodiment, which passes through a corrosion-resistant portion.
Figure 34:
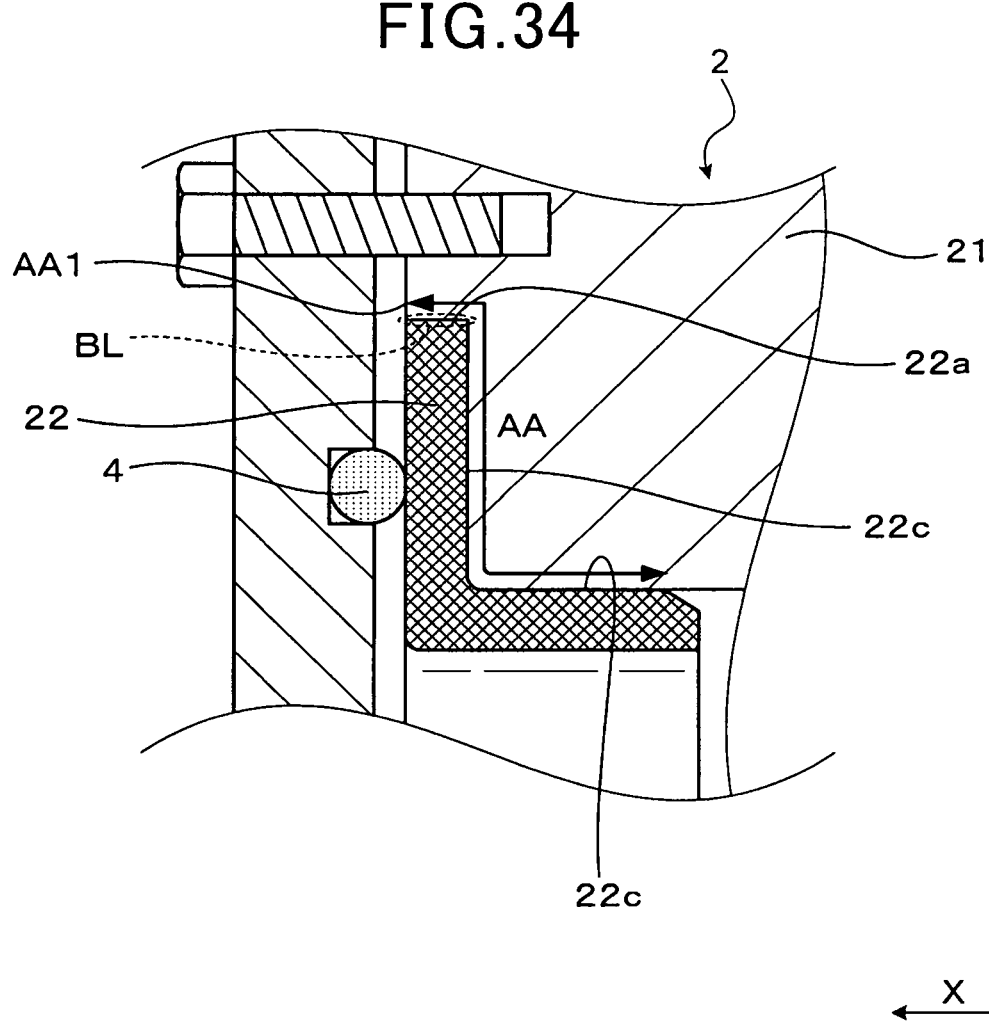
FIG. 34 is an enlarged schematic view of a joint surface and its vicinity illustrated in FIG. 33, which is used for describing a creepage direction and joint surface outside.

An eighteenth embodiment, as illustrated in FIGS. 33 and 34, is devised to prevent an aqueous solution promoting corrosion of the case body 21 from entering between the corrosion-resistant portion 22 and the case body 21 from the outside of the power conversion device 1.

As illustrated in FIG. 33, as in the second embodiment, the case body 21 has the body through-hole 210 penetrating the inside and outside of the case body 21. As in the second embodiment, the annular concave portion 211 recessed toward the rear side is formed around the periphery of the body through-hole 210 on the front surface of the case body 21. The corrosion-resistant portion 22 is the same in structure as that in the second embodiment. Specifically, the corrosion-resistant portion 22 is ring-shaped as seen from the longitudinal direction X, and has the plate-like portion 221 with a thickness in the longitudinal direction X and the cylindrical extension portion 222 that is extended from part of the plate-like portion 221 to the rear side.

The corrosion-resistant portion 22 is press-fitted or bonded to the case body 21. The surface of the corrosion-resistant portion 22 has the joint surface 22a and the opposed surface 22c that is opposed to the case body 21 without being pressure-welded or bonded to the case body 21. In the eighteenth embodiment, the joint surface 22a constitutes the outer peripheral end surface of the plate-like portion 221 in the corrosion-resistant portion 22. The opposed surface 22c constitutes the back surface 223 of the plate-like portion 221 and the outer peripheral surface 224 of the extension portion 222. As illustrated in FIG. 34, the joint surface 22a is formed on an opposed surface exterior AA1 that is more separated from the opposed surface 22c of the corrosion-resistant portion 22 in a creepage direction AA toward the outside of the case 2 than the entire opposed surface 22c. That is, the joint surface 22a is formed closer to the opposed surface exterior AA1 than the end edge of the back surface 223 of the plate-like portion 221 on the opposed surface exterior AA1. The opposed surface 22c is not formed on the opposed surface exterior AA1 of the joint surface 22a. FIG. 34 represents schematically the creepage direction AA by a double-headed arrow.

In other respects, the eighteenth embodiment is identical to the second embodiment.

In the eighteenth embodiment, the joint surface 22a without entry of water from the outside of the case 2 between the joint surface 22a and the case body 21 is formed closer to the opposed surface exterior AA1 than the entire opposed surface 22c. Therefore, it is possible to prevent an aqueous solution promoting corrosion of the case body 21 from entering between the opposed surface 22c of the corrosion-resistant portion 22 and the case body 21 from the outside of the power conversion device 1. This makes it possible to prevent generation and accumulation of foreign matter between the opposed surface 22c of the corrosion-resistant portion 22 and the case body 21.

Other features of the eighteenth embodiment provide the same operations and effects as those of the second embodiment.

Nineteenth Embodiment

Figure 35:
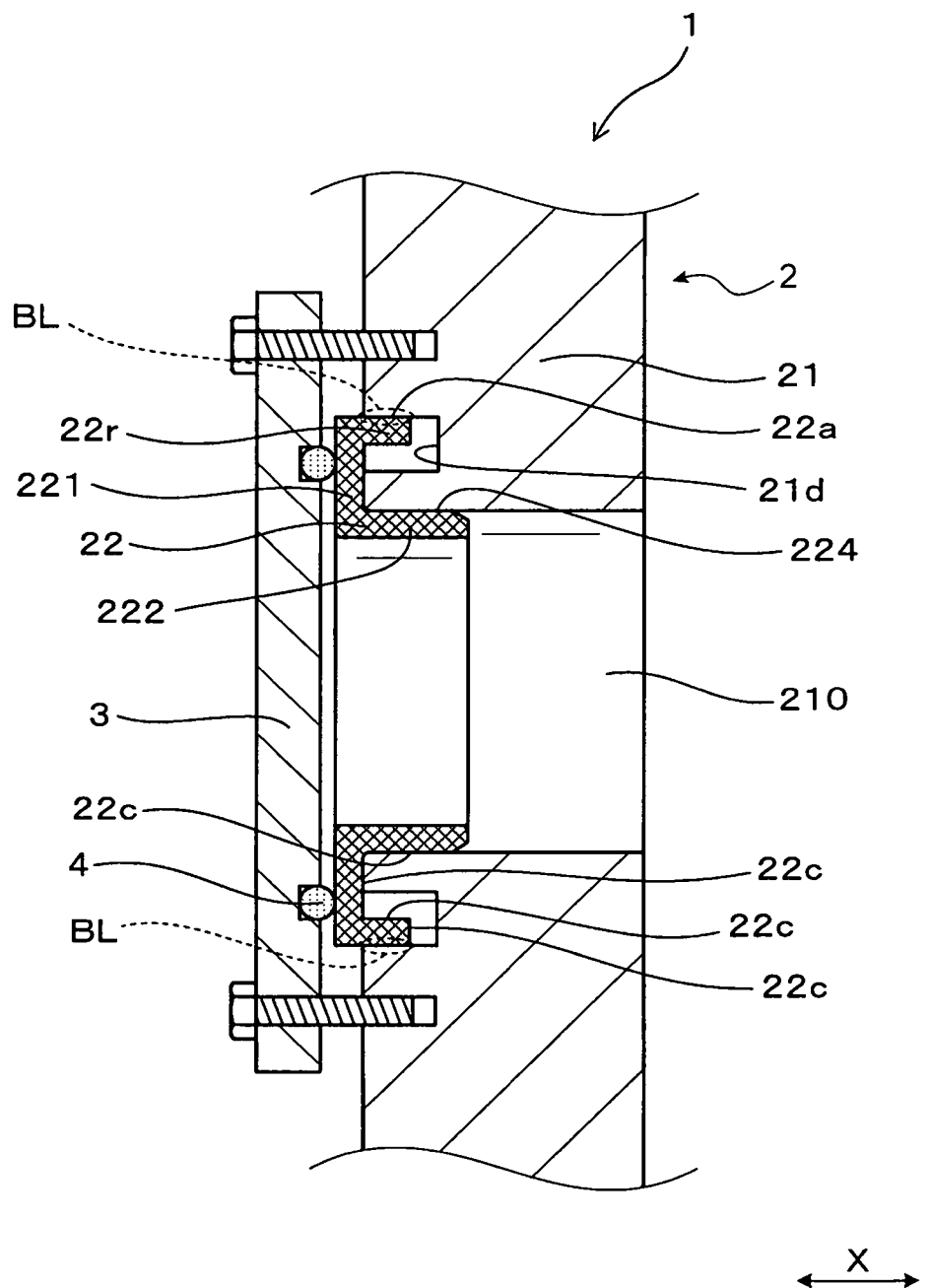
FIG. 35 is an enlarged cross-sectional view of a power conversion device according to a nineteenth embodiment, which passes through a corrosion-resistant portion.

In a nineteenth embodiment, as illustrated in FIG. 35, the shape of the case body 21 and the shape of the corrosion-resistant portion 22 in the eighteenth embodiment are changed. In the nineteenth embodiment, the corrosion-resistant portion 22 has the cylindrical backward protrusion portion 22r recessed toward the rear side on the outer peripheral side of the plate-like portion 221. The engagement groove portion 21d identical to that in the seventeenth embodiment is formed on the front surface of the case body 21 separated from the body through-hole 210 toward the outer peripheral side. In the nineteenth embodiment, the corrosion-resistant portion 22 is bonded or pressure-welded to the outer peripheral surface of the engagement groove portion 21d on part of the outer peripheral surface of the backward protrusion portion 22r. That is, in the nineteenth embodiment, part of the outer peripheral surface of the backward protrusion portion 22r constitutes the joint surface 22a.

The back end surface of the backward protrusion portion 22r, the inner peripheral surface of the backward protrusion portion 22r, the back surface 223 of the plate-like portion 221, and the outer peripheral surface 224 of the extension portion 222 are opposed to the case body 21 without being pressure-welded or bonded to the case body 21 and constitute the opposed surface 22c. In the nineteenth embodiment, as in the eighteenth embodiment, the joint surface 22a is formed closer to the opposed surface outside than to the entire opposed surface 22c.

In other respects, the nineteenth embodiment is identical to the eighteenth embodiment.

The nineteenth embodiment provides the same operations and effects as those of the eighteenth embodiment.

Twentieth Embodiment

Figure 36:
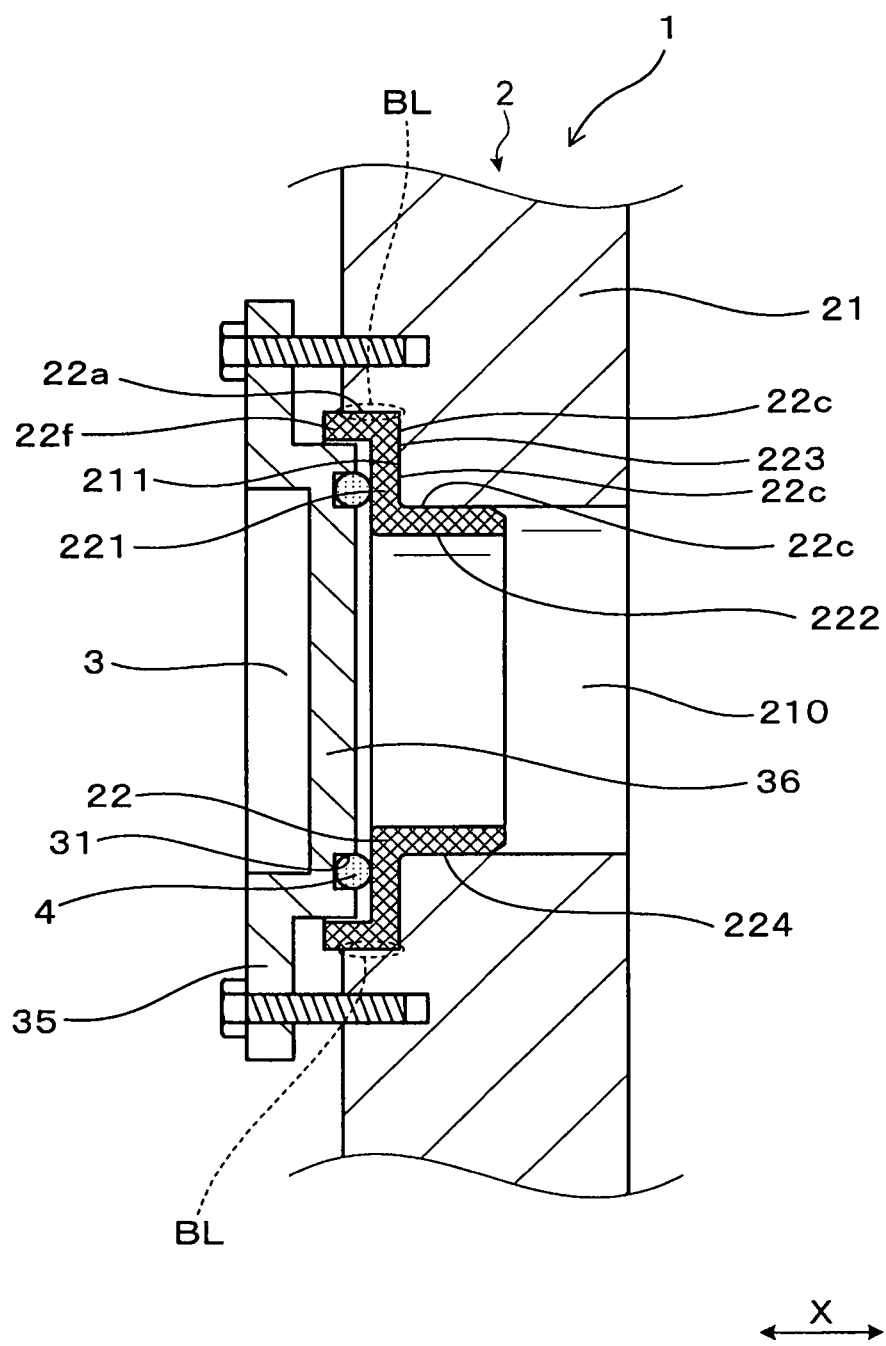
FIG. 36 is an enlarged cross-sectional view of a power conversion device according to a twentieth embodiment, which passes through a corrosion-resistant portion.

In a twentieth embodiment, as illustrated in FIG. 36, the shape of the case body 21 and the shape of the corrosion-resistant portion 22 in the eighteenth embodiment are changed.

As in the second embodiment, the annular concave portion 211 recessed toward the rear side is formed around the periphery of the body through-hole 210 on the front surface of the case body 21.

The corrosion-resistant portion 22 has a cylindrical forward protrusion portion 22f extending to the front side on the outer peripheral side of the plate-like portion 221. The corrosion-resistant portion 22 has the plate-like portion 221 and the forward protrusion portion 22f fitted into the annular concave portion 211 in the case body 21. The corrosion-resistant portion 22 is bonded or pressure-welded to the outer peripheral surface of the annular concave portion 211 on part of the outer peripheral surface of the forward protrusion portion 22f That is, in the twentieth embodiment, part of the outer peripheral surface of the forward protrusion portion 22f constitutes the joint surface 22a.

The back end surface of the forward protrusion portion 22f, the back surface 223 of the plate-like portion 221, and the outer peripheral surface 224 of the extension portion 222 are opposed to the case body 21 without being pressure-welded or bonded to the case body 21, and constitute the opposed surface 22c. In the twentieth embodiment, as in the eighteenth embodiment, the joint surface 22a is formed closer to the opposed surface outside than to the entire opposed surface 22c. The O-ring 4 is pressure-welded to the front surface of the plate-like portion 221 in the corrosion-resistant portion 22.

The cover 3 has an outer peripheral region 35 including the bolt insertion holes 5 and an inner peripheral region 36 recessed from the outer peripheral portion 35 to the front side. The hold groove 31 is formed on the back surface of the inner peripheral portion 36.

In other respects, the twentieth embodiment is identical to the eighteenth embodiment.

The twentieth embodiment provides the same operations and effects as those of the eighteenth embodiment.

The present disclosure has been described so far according to examples, but it is noted that the present disclosure is not limited to the foregoing examples or structures. The present disclosure includes various modifications and changes in a range of equivalency. In addition, various combinations and modes, and other combinations and modes including only one element of the foregoing combinations and modes, less or more than the one element fall within the scope and conceptual range of the present disclosure. For example, in the second embodiment, the plate-like portion 221 has a ring shape and the extension portion 222 has a cylindrical shape as seen from the front side. Alternatively, for example, the plate-like portion 221 may have a rectangular annular shape and the extension portion 222 may have a rectangular cylindrical shape as seen from the front side. In other embodiments, similar modifications are possible.

In the thirteenth to twentieth embodiments, the corrosion-resistant portion 22 has the plate-like portion 221 and the extension portion 222 but is not limited to this. For example, the corrosion-resistant portion 22 may not have the plate-like portion 221 in the seventeenth to twentieth embodiments. In addition, in the thirteenth to twentieth embodiments, the fixed member is the cover 3 but is not limited to this. For example, the fixed member may be the pipe 300 as in the fifth embodiment or may be the external device 30 as in the eighth embodiment.

The invention claimed is:

1. A power conversion device comprising:
a case that has a metallic case body;
a fixed member that is fixed to the case from the outside of the case; and
a seal member that adheres closely to both the case and the fixed member to ensure water-tightness between the case and the fixed member, wherein,
the case is partly formed with a corrosion-resistant portion that is less likely to suffer corrosion than the case body,
the fixed member is attached to the corrosion-resistant portion via the seal member,
the corrosion-resistant portion has an annular cross section orthogonal to a longitudinal direction,
the case body has a body through-hole that penetrates inside and outside of the case,
the body through-hole has a step portion that is smaller in inner diameter on the rear side than the front side,
the corrosion-resistant portion is fitted into a front side of the step portion in the body through-hole, and
the fixed member is a pipe with an internal flow path.

2. The power conversion device according to claim 1, wherein
the corrosion-resistant portion has a plate-like portion and an extension portion that is extended from part of the plate-like portion, and
at least a back surface of the plate-like portion and an outer peripheral surface of the extension portion are in contact with the case body.

3. The power conversion device according to claim 1, wherein
the corrosion-resistant portion is press-fitted into a press-fit hole portion formed in the case body.

4. The power conversion device according to claim 3, wherein
the case body has an inclined portion that is inclined with a diameter increasing forward from the front end of the press-fit hole portion.

5. The power conversion device according to claim 4, wherein
the corrosion-resistant portion has a plate-like portion and an extension portion that is extended from part of the plate-like portion,
at least a back surface of the plate-like portion and the outer peripheral surface of the extension portion are in contact with the case body, and
the inclined portion is formed to separate a predetermined distance from the back surface of the plate-like portion.

6. The power conversion device according to claim 3, wherein
a surface of the corrosion-resistant portion in contact with the press-fit hole portion has a circular cross section orthogonal to a longitudinal direction.

7. The power conversion device according to claim 3, wherein
a region of the corrosion-resistant portion press-fitted into the press-fit hole portion has a front surface or a back surface recessed.

8. The power conversion device according to claim 1, wherein
the inner diameter of the body through-hole on the rear side of the step portion is equal to the inner diameter of the corrosion-resistant portion.

9. The power conversion device according to claim 1, wherein
the corrosion-resistant portion is formed from a metal or an alloy.

10. The power conversion device according to claim 9, wherein
the corrosion-resistant portion is formed from stainless steel.

11. The power conversion device according to claim 1, mounted in a vehicle.

12. The power conversion device according to claim 1, wherein
the corrosion-resistant portion is press-fitted or bonded to the case body,
the surface of the corrosion-resistant portion has a joint surface pressure-welded or bonded to the case body and an outside opposed surface that is formed on a joint surface outside that is more separated from the joint surface of the corrosion-resistant portion in a creepage direction toward the outside of the case than the joint surface and is opposed to the case body without being pressure-welded or bonded to the case body, and
a part of the outside opposed surface is opposed to the case body via a deformation avoidance clearance that suppresses deformation of the corrosion-resistant portion due to the force exerted by foreign matter accumulated between the outside opposed surface and the case body.

13. The power conversion device according to claim 12, wherein
the outside opposed surface and a body opposed surface that is part of the case body and opposed to the outside opposed surface are relatively inclined such that the deformation avoidance clearance becomes wider with increasing proximity to the joint surface outside.

14. The power conversion device according to claim 12, wherein
the deformation avoidance clearance is formed from a groove on at least one of the outside opposed surface and the body opposed surface that is part of the case body and opposed to the outside opposed surface.

15. The power conversion device according to claim 1, wherein
the corrosion-resistant portion is press-fitted or bonded to the case body,
the surface of the corrosion-resistant portion has the joint surface that is pressure-welded or bonded to the case body and an opposed surface that is opposed to the case body without being pressure-welded or bonded to the case body,
the joint surface is formed on an opposed surface exterior that is more separated from the opposed surface of the corrosion-resistant portion in a creepage direction toward the outside of the case than the opposed surface.

16. A power conversion device comprising:
a case that has a metallic case body;
a fixed member that is fixed to the case from the outside of the case; and
a seal member that adheres closely to both the case and the fixed member to ensure water-tightness between the case and the fixed member, wherein,
the case is partly formed with a corrosion-resistant portion that is less likely to suffer corrosion than the case body,
the fixed member is attached to the corrosion-resistant portion via the seal member,
the corrosion-resistant portion is press-fitted or bonded to the case body,
the surface of the corrosion-resistant portion has a joint surface pressure-welded or bonded to the case body and an outside opposed surface that is formed on a joint surface outside that is more separated from the joint surface of the corrosion-resistant portion in a creepage direction toward the outside of the case than the joint surface and is opposed to the case body without being pressure-welded or bonded to the case body, and
a part of the outside opposed surface is opposed to the case body via a deformation avoidance clearance that suppresses deformation of the corrosion-resistant portion due to the force exerted by foreign matter accumulated between the outside opposed surface and the case body.

17. The power conversion device according to claim 16, wherein
the outside opposed surface and a body opposed surface that is part of the case body and opposed to the outside opposed surface are relatively inclined such that the deformation avoidance clearance becomes wider with increasing proximity to the joint surface outside.

18. The power conversion device according to claim 16, wherein
the deformation avoidance clearance is formed from a groove on at least one of the outside opposed surface and the body opposed surface that is part of the case body and opposed to the outside opposed surface.

19. A power conversion device comprising:
a case that has a metallic case body;
a fixed member that is fixed to the case from the outside of the case; and
a seal member that adheres closely to both the case and the fixed member to ensure water-tightness between the case and the fixed member, wherein,
the case is partly formed with a corrosion-resistant portion that is less likely to suffer corrosion than the case body,
the fixed member is attached to the corrosion-resistant portion via the seal member,
the corrosion-resistant portion is press-fitted or bonded to the case body,
the surface of the corrosion-resistant portion has the joint surface that is pressure-welded or bonded to the case body and an opposed surface that is opposed to the case body without being pressure-welded or bonded to the case body, and
the joint surface is formed on an opposed surface exterior that is more separated from the opposed surface of the corrosion-resistant portion in a creepage direction toward the outside of the case than the opposed surface.

* * * * *